United States Patent
Sarikaya et al.

(10) Patent No.: US 10,417,566 B2
(45) Date of Patent: Sep. 17, 2019

(54) SELF-LEARNING TECHNIQUE FOR TRAINING A PDA COMPONENT AND A SIMULATED USER COMPONENT

(71) Applicant: Microsoft Technology Licensing, LLC, Redmond, WA (US)

(72) Inventors: Ruhi Sarikaya, Redmond, WA (US); Paul A. Crook, Bellevue, WA (US); Marius Alexandru Marin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 586 days.

(21) Appl. No.: 15/161,268

(22) Filed: May 22, 2016

(65) Prior Publication Data

US 2017/0337478 A1 Nov. 23, 2017

(51) Int. Cl.
*G06N 5/02* (2006.01)
*G06F 3/16* (2006.01)
*G06F 17/27* (2006.01)
*G10L 15/22* (2006.01)

(52) U.S. Cl.
CPC ............ *G06N 5/025* (2013.01); *G06F 3/167* (2013.01); *G06F 17/279* (2013.01); *G10L 15/22* (2013.01)

(58) Field of Classification Search
CPC .......... G06F 15/18; G06N 5/00; G06N 5/025; G06N 7/00
USPC ........................................ 706/12, 14, 45–48
See application file for complete search history.

(56) References Cited

U.S. PATENT DOCUMENTS

| | | | |
|---|---|---|---|
| 6,513,024 B1 | 1/2003 | Li | |
| 9,390,371 B2* | 1/2016 | Deng et al. | G06N 3/0454 |
| 2006/0112029 A1 | 5/2006 | Estes | |
| 2007/0136219 A1 | 6/2007 | Kim et al. | |
| 2009/0306995 A1* | 10/2009 | Weng et al. | G06Q 10/103 |
| | | | 705/301 |

FOREIGN PATENT DOCUMENTS

| | | |
|---|---|---|
| JP | 2004139383 A | 5/2004 |
| JP | 2011258166 A | 12/2011 |

OTHER PUBLICATIONS

Griol, et al., "A Statistical Simulation Technique to Develop and Evaluate Conversational Agents", In Journal of AI Communications, vol. 26, Issue 4, Oct. 1, 2013, pp. 355-371.

(Continued)

*Primary Examiner* — Paulinho E Smith
(74) *Attorney, Agent, or Firm* — Rainier Patents, P.S.

(57) ABSTRACT

A computer-implemented technique is described herein for training a personal digital assistant (PDA) component and a simulated user (SU) component via a self-learning strategy. The technique involves conducting interactions between the PDA component and the SU component over the course of plural dialogs, and with respect to plural tasks. These interactions yield training data. A training system uses the training data to generate and update analysis components used by both the PDA component and the SU component. According to one illustrative aspect, the SU component is configured to mimic the behavior of actual users, across a range of different user types.

20 Claims, 15 Drawing Sheets

(56) References Cited

OTHER PUBLICATIONS

Mairesse, et al., "Stochastic Language Generation in Dialogue Using Factored Language Models", In Proceedings of ACM Computational Linguistics, vol. 40, No. 4, Dec. 1, 2014, pp. 763-799.
Lee, et al., "Example-Based Dialog Modeling for Practical Multi-Domain Dialog System", In Proceedings of ACM Speech Communication, vol. 51, Issue 5, May 1, 2009, pp. 466-448.
"International Search Report and Written Opinion Issued in PCT Application No. PCT/US2017/033000", dated Aug. 23, 2017, 13 Pages.
Chandramohan, et al., "Co-adaptation in Spoken Dialogue Systems", In the Proceedings of The Fourth International Workshop on Spoken Dialog Systems, Nov. 30, 2012, pp. 1-11.
Janarthanam, et al., "Adaptive Generation in Dialogue Systems Using Dynamic User Modeling", In Proceedings of ACM Computational Linguistics, vol. 40, Issue 4, Dec. 1, 2014, pp. 883-920.
Mitchell, et al., "Experience with a Learning Personal Assistant," in Communications of the ACM, vol. 37, No. 7, 1994, 11 pages.
Murphy, Kevin, "A brief introduction to reinforcement learning," available at «http://www.cs.ubc.ca/~murphyk/Bayes/pomdp.html», published on 1998, 6 pages.
Suganya, K., "A Review of Intelligent Agents," in International Journal of Engineering Research and General Science, vol. 2, Issue 2, 2014, 7 pages.
Jennings, et al., "Software Agents," in Journal of IEE Review, 1996, 9 pages.
Maes, et al., "Learning Interface Agents," in Proceedings of the Eleventh National Conference on Artificial Intelligence, vol. 93, 1993, 7 pages.
Fischer, Gerhard, "User Modeling in Human-Computer Interaction," in Journal of User Modeling and User-Adapted Interaction, vol. 11, Issue 1-2, 2001, 22 pages.
Herlea, et al., "Specification of Behavioral Requirements within Compositional Multi-agent System Design," in Proceedings of the 9th European Workshop on Modelling Autonomous Agents in a Multi-Agent World, 1999, 22 pages.
Webb, et al., "Machine Learning for User Modeling," in Journal of User Modeling and User-Adapted Interaction, vol. 11, Issue 1-2, 2001, 11 pages.
"Reinforcement learning," available at «https://en.wikipedia.org/wiki/Reinforcernent_learning», Wikipedia article, accessed on Apr. 18, 2016, 10 pages.
Silver, et al., "Mastering the Game of Go with Deep Neural Networks and Tree Search," in Nature, vol. 529, Jan. 2016, 37 pages.
Silver, et al., "AlphaGo: Mastering the ancient game of Go with Machine Learning," available at «http://googleresearch.blogspot.com/2016/01/alphago-mastering-ancient-game-of-go.html», Google Research Blog, Jan. 2016, 6 pages.
Mnih, et al., "Playing Atari with Deep Reinforcement Learning," in arXiv:1312.5602, NIPS Deep Learning Workshop 2013, 2013, 10 pages.
Williams, Jason D., "Scaling POMDPs for spoken dialog management," in IEEE Transactions on Audio, Speech & Language Processing, 2007, 15 pages.
Chung, et al., "Empirical Evaluation of Gated Recurrent Networks on Sequence Modeling," in arXiv:1412.3555, 2014, 9 pages.
Sutskever, et al., "Sequence to Sequence Learning with Neural Networks," in the Twenty-eighth Annual Conference on Neural Information Processing Systems (NIPS), 2014, 9 pages.

\* cited by examiner

SELF-LEARNING TECHNIQUE FOR TRAINING A PDA COMPONENT AND A SIMULATED USER COMPONENT

BACKGROUND

A personal digital assistant (PDA) component assists users in performing various tasks, such as scheduling appointments, making reservations, querying a database, ordering a product, and so on. A PDA component typically operates using one or more rules-based engines and/or statistical machine-trained models, generically referred to as PDA-analysis components herein. In part, the PDA-analysis components perform the tasks of recognizing a user's speech utterance, analyzing the semantic content of the user's utterance, tracking the state of the current conversation, providing a dialog policy based on one or more machine-trained models and/or rules-based engines, determining an appropriate reply to the user's utterance based on the dialog policy, etc. As the term is used herein, an "utterance" refers to a linguistic expression presented in any form, e.g., voiced form, typed form, etc., or combination thereof.

A developer produces the PDA-analysis components by placing heavy reliance on human experts. For example, in the case of machine-trained models, the developer may rely on human experts to perform at least the following tasks: applying meaningful labels to training data; guiding the training process; validating the accuracy of the resultant machine-trained models, etc. In the case of rules-based engines, the developer may rely on human experts to perform at least the following tasks: providing hand-crafted rules; generating a dialog flow with appropriate prompts; validating the accuracy of the resultant rules, etc.

Generally, the task of producing accurate PDA-analysis components is a complex, time-consuming, and expensive process. A developer may have difficulty finding appropriate experts to create the PDA-analysis components. Moreover, the developer may encounter the need to update the PDA-analysis components on a frequent basis to address changes in the applications that use the analysis components and/or the environment in which the analysis components are expected to operate; this factor compounds the already difficult challenges posed in the development process.

SUMMARY

A computer-implemented technique is described herein for training a personal digital assistant (PDA) component in an automated manner (or at least a partially automated manner). The technique involves conducting interactions between the PDA component and a simulated user (SU) component over the course of plural dialogs, and with respect to plural tasks. These interactions yield training data. A training system uses a self-learning strategy to iteratively improve the performance of the PDA component based on the training data. The technique also uses the self-learning strategy to iteratively improve the performance of the SU component based on the training data.

According to one illustrative aspect, the technique trains the SU component to mimic the behavior of actual users, across a range of different user types. For instance, the SU component takes account for both ideal user behavior and various forms of non-ideal (anomalous) user behavior. For example, the SU component can approximate the behavior of users who make ambiguous utterances, users who change their minds in the course of a dialog, etc. In the process of mimicking human-PDA dialog interactions, the PDA component and the SU component cooperatively generate new training data.

According to another illustrative aspect, the technique assesses the performance of the SU component based on the extent to which it: (a) efficiently contributes to the completion of different kinds of tasks; and (b) approximates the behavior of the real users.

According to another illustrative aspect, the SU component employs at least one neural network to map a particular PDA utterance (along with other context-based feature values) to a particular SU utterance.

Overall, the technique expedites and reduces the cost of developing PDA-analysis components by eliminating or reducing the role of human experts in the training process. Further, the technique can produce more accurate and robust PDA-analysis components compared to conventional manual training techniques.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
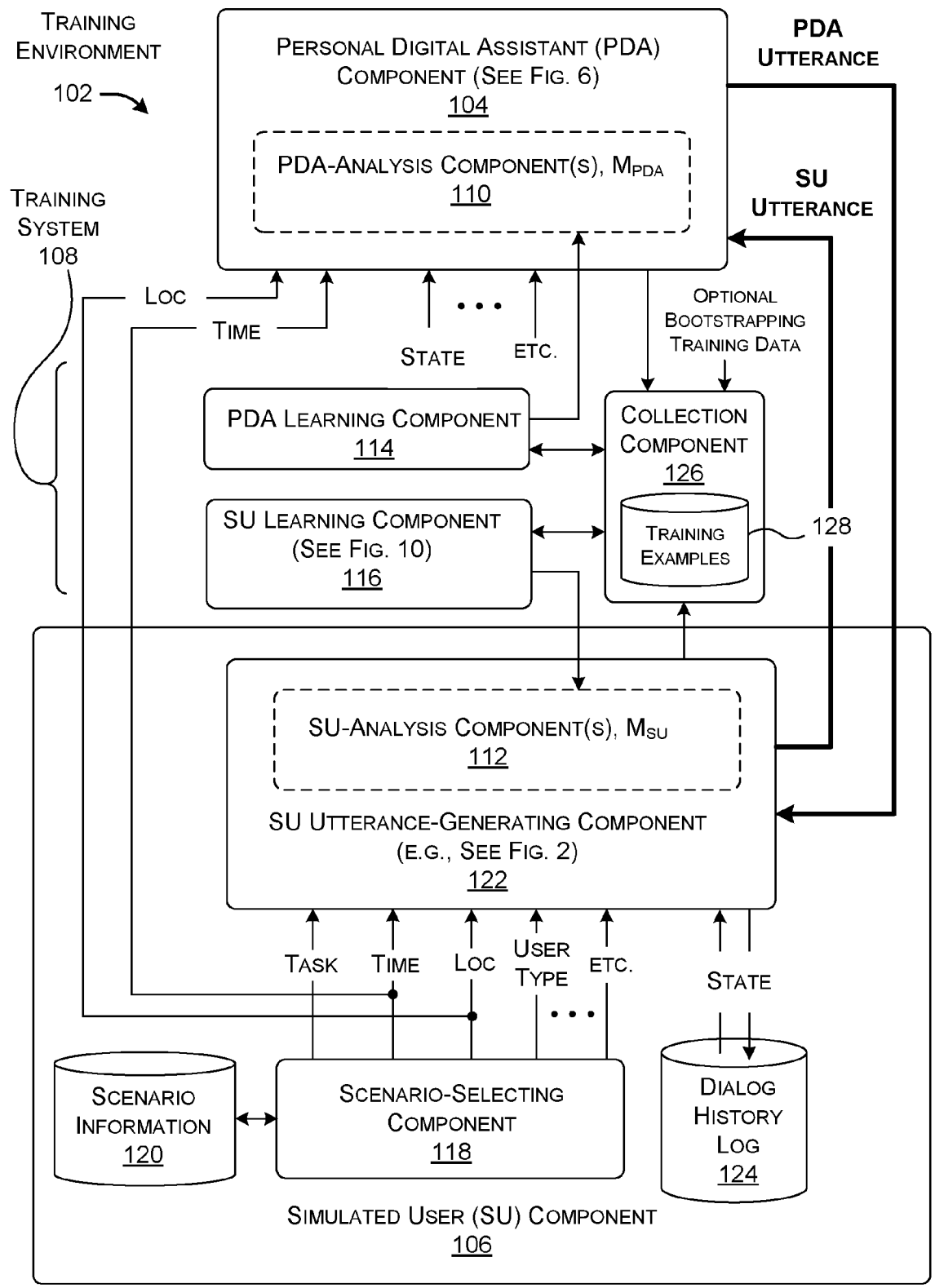
FIG. 1 shows an illustrative environment including a personal digital assistant (PDA) component, a simulated user (SU) component, and a training system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented environment for training a personal digital assistant (PDA) component using a simulated user (SU) component. Section B sets forth illustrative methods which explain the operation of the environment of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Environment

A.1. Overview

FIG. 1 shows an illustrative environment 102 (also referred to as a computer-implemented system) including a personal digital assistant (PDA) component 104, a simulated user (SU) component 106, and a training system 108. The PDA component 104 corresponds to computer-implemented functionality that provides assistance to human users in performing a variety of tasks, such as scheduling a meeting, setting up a reminder, querying a database, making a reservation, and so on. The PDA component 104 performs its services using one or more PDA-analysis components 110, such as one or more statistical machine-trained models, one or more rule-application engines, and so on, or any combination thereof. The SU component 106 corresponds to computer-implemented functionality that simulates the behavior of a real user in his or her interaction with the PDA component 104. The SU component 106 provides its services using one or more SU-analysis components 112, such as one or more statistical machine-trained models, one or more rule-application engines, and so on, or any combination thereof. The training system 108 includes a PDA learning component 114 for producing and updating at least some of the PDA-analysis component(s) 110, and a SU learning component 116 for producing and updating the SU-analysis component(s) 112. The training system 108 generally performs its training based on recorded interactions between the PDA component 104 and the SU component 106, over the course of several dialogs, and across various tasks.

The PDA component 104 and the SU component 106 can be implemented by a single computing device, or by different respective computing devices. As will be further clarified below (in Section C), other implementations can use two or more PDA components and/or two or more SU components.

This subsection provides an overview of the main components shown in FIG. 1. Subsection A.2 provides additional illustrative detail regarding the SU component 106. Subsection A.3 provides additional illustrative detail regarding the PDA component 104. And Subsection A.4 provides additional illustrative detail regarding the training system 108.

Starting with the SU component 106, the SU component 106 includes a scenario-selecting component 118. The scenario-selecting component 118 defines, at the start of a particular dialog between the PDA component 104 and the SU component 106, the principal context-based feature values of that dialog. Those characteristics collectively constitute a particular dialog scenario. Upon the start of another dialog, the scenario-selecting component 118 defines another scenario.

Different implementations of the scenario-selecting component 118 can define different sets of context-based feature values. For example, the scenario-selecting component 118 chooses a task that the SU component 106 aims to complete as a result of the dialog. For instance, the scenario may describe the task of setting up an appointment, making a reservation, etc. Each task is associated with a goal which defines its successful completion. For example, the task of setting up an appointment culminates (if successful) in the creation of an appointment in a calendar system. The task of querying a database culminates (if successful) in the delivery of satisfactory information to the SU component 106. Each task is represented by a corresponding task ID.

The scenario-selecting component 118 also chooses a user type. Each user type correlates with a different type of user behavior to be simulated by the SU component 106, within the limited scope of the ensuing dialog. For example, one user type can approximate the behavior of real users who interact with the PDA component 104 in an ideal manner, e.g., by providing expected and unambiguous utterances in response to prompts by the PDA component 104. Other user types can diverge from ideal user behavior in one or more respects. For instance, another user type can generally approximate the behavior of novice users who are unfamiliar with the services provided by the PDA component 104. Another user type can approximate the behavior of users who make ambiguous and incomplete utterances. Another user type can approximate the behavior of users who are speaking in a language other than their respective native tongues, or who have some type of language impairment. Another user type can approximate the behavior of users who have a particular accent or other region-based speech characteristics. Another user type approximates the behavior of users who have some type of cognitive impairment, commonly resulting in confusion by the users during the course of a dialog. Another user type can approximate the behavior of users who frequently change their minds in the course of a dialog, e.g., by changing previously specified information items, changing tasks, etc. Another user type can approximate the behavior of users who sometimes provide a series of information items in an unconventional order, e.g., by selecting a seat assignment without first indicating a mode of travel. Another user type can approximate the behavior of users who provide plural information items in a single dialog turn. Another user type can approximate the behavior of inquisitive users who do not necessarily wish to quickly terminate a dialog session, but sometimes wish to explore many alternatives and options, e.g., in the course of making a reservation, etc. Another user type can approximate the behavior of a user group made up of users within a particular range of ages, and so on. Each user type is represented by a user type ID.

The above user types are cited by way of example, not limitation; other implementations can define any number of user types based on any criteria. Further, any user type may reflect a combination of two or more principal user characteristics.

The scenario-selecting component 118 can also define other dimensions of a scenario, such as a presumed location at which the simulated user (associated with the SU component 106) will perform the dialog, the presumed time at which the dialog will take place, the presumed user device that the simulated user will use to conduct the dialog, and so on. To be more explicit, the SU component 106 does not literally carry out the dialog from a particular location and time, and by using a particular user device; rather, the SU component 106 simulates the behavior of a user who is interacting with the PDA component 104 within a context defined by the selected scenario.

The scenario-selecting component 118 can select a scenario in different ways. In one case, a data store 120 stores a set of options for each dimension of a scenario. The scenario-selecting component 118 can randomly pick an option from each dimension of the scenario. For example, the scenario-selecting component 118 can randomly select a location from a collection of possible locations, select a user type from a collection of possible user types, select a time from a set of possible times, and so on. The data store 120 can store option information using any kind of data structure or combination of data structures, such as, but not limited to, a flat file, a set of database tables, a knowledge graph with a relational ontology, etc.

An SU utterance-generating component 122 generates the SU utterances that make up each particular dialog. (As the term is used herein, an "utterance" refers to a linguistic expression presented in any form, e.g., voiced form, typed form, etc., or combination thereof.) The SU utterance-generating component 122 generates each utterance of a dialog by mapping input parameter information into the SU utterance. As a main feature, the input parameter information may include the most recent PDA utterance provided by the PDA component 104 (although in some cases the input parameter information does not include a PDA utterance). For example, for the task of scheduling an appointment, one representative PDA utterance may correspond to the question, "Where is the location of the meeting?" In this example, the SU utterance may provide an answer to the PDA utterance, such as by providing the appropriate response, "City Hall, Room C." As will be described below, however, the SU utterance can exhibit various errors and anomalies, e.g., by providing the response, "City Hall, 5:00 PM," or "Bob Jones, 5:00 PM," etc. Errors in an SU utterance can originate from one or more sources. Some errors may stem from the characteristics of the user type that the environment 102 is modeling in a particular dialog under consideration; in this case, the environment 102 purposely generates these kinds of errors. Other errors may reflect the fact that, at a present state of a training regimen, the SU component 106 has not yet learned an appropriate response to the given input parameter information (in this example, including the question "Where is the location of the meeting?"). The environment 102 can be expected to provide a greater percentage of anomalous responses in the early stages of its training because it has not yet processed sufficient training examples to learn meaningful reactions to different dialog situations.

The input parameter information can also include all (or any piece) of the context-based feature values identified by the scenario-selecting component 118, such as task ID, user type, time, location, etc. The input parameter information can describe the user type in different ways. For example, the input parameter information can provide a label associated with the user type and/or any parameter values associated with the user type. For example, the input parameter information can identify a particular user group by specifying its associated user type ID, along with the average number of turns that users associated with that user type take to complete tasks.

The input parameter information can also specify the current state of the dialog. The SU component 106 can represent the state in different ways, such as by describing what actions have transpired so far in the dialog (and what information items have been collected that are needed to perform the task under consideration), and/or what actions have yet to be completed (and what information items have yet to be obtained). Alternatively, or in addition, the SU component 106 can map each instance of state information (representing the course of the ongoing dialog) into a high-level summary form (an embedding) of any type, such as a vector, etc. The SU component 106 can store the state information, in whatever manner it is expressed, in a data store 124. The SU utterance-generating component 122 can retrieve all such state information from the data store 124 as part of its process of generating the SU utterance.

Subsection A.2 will describe different strategies by which the SU utterance-generating component 122 maps the input parameter information into a particular SU utterance. By way of preview of that subsection, the SU utterance-generating component 122 can use one or more deep-learning machine-trained neural networks to perform the mapping.

Now turning to the PDA component 104, the PDA component 104 performs various tasks upon receiving a particular SU utterance. First, if the SU utterance is vocalized and received in audio form, the PDA component 104 uses automatic speech recognition to convert the SU utterance into recognized speech information. The PDA component 104 then uses natural language understanding (LU) to interpret the SU utterance, e.g., by determining the domain of the utterance, the intent of the utterance, and the slot values associated with the utterance (all described in greater detail below); this yields an interpreted SU utterance. The PDA component 104 device then employs a dialog management component to map the interpreted SU utterance into an appropriate response, constituting a PDA utterance. The dialog management component also tracks the state of the ongoing conversation. Finally, the PDA component 104 sends the PDA utterance to the SU component 106.

From a high-level perspective, the PDA component 104, like the SU component 106, can be said to map input parameter information into a particular PDA utterance. The input parameter information fed to the PDA component 104 foremost includes the most recent SU utterance, if any. In addition, the PDA component 104 can include some of the context-based feature values that are also fed to the SU component 106. For example, the input parameter information can include an indication of the time at which the dialog is assumed to be taking place and the location from which the dialog is assumed to be taking place.

But the input parameter information fed to the PDA component 104 can also omit some of the context-based feature values fed to the SU component 106. For example, in one implementation, the PDA component 104 is not given explicit notification of the task and user type defined by the scenario-selecting component 118. Rather, the PDA component 104 is expected to infer these attribute values based on the SU utterances. Further, the PDA component 104 receives information regarding the current state of the dialog, but this information is based on its own separate tracking of state, rather than state information stored in the data store 124 of the SU component 106. In brief, the PDA component 104 is expected to make the same inferences that it would upon interacting with a human being (where, for example, the PDA component 104 is expected to infer what task the user is attempting to complete based on the user's utterances).

Now referring to the training system 108, a collection component 126 collects training data that reflects utterances exchanged between the PDA component 104 and the SU component 106 over the course of several dialogs, and across different dialog scenarios associated with those dialogs. For instance, the collection component 126 can store all aspects of each dialog, such as the utterances exchanged between the PDA component 104 and the SU component 106, and all the context-based feature values associated with the dialog (as explicitly defined by the scenario-selecting component 118). The training data can also store an indication of whether or not the dialog achieved the intended task associated with the dialog. The collection component 126 stores the training data in a data store 128. Optionally, the collection component 126 can also collect and store training data that reflects interactions between the PDA component 104 and actual human users. Optionally, the collection component 126 can also collect and store paraphrase data, which is described in greater detail below.

The SU learning component 116 updates the SU-analysis component(s) 112 based on the training data. Likewise, the PDA learning component 114 updates the PDA-analysis component(s) 110 based on the training data. As will be described in greater detail in Subsection A.4, the training system 108 can perform at least some of its training using any kind of machine-learning technique. For example, the SU learning component 116 can use a machine-learning technique to update the weighting values of a neural network, where those weighting values collectively constitute an SU-analysis component.

In some implementations, the training system 108 also uses reinforcement learning in its training. In this approach, for instance, the SU learning component 116 calculates value information which expresses a value of a particular action (i.e., a particular SU utterance), given a current state of the dialog in which the particular action is performed. The SU learning component 116 performs this operation by calculating whether the dialog actions that are likely to follow the particular action: (a) will efficiently lead to a successfully completion of the task associated with the dialog; and (b) will resemble target dialog-related behavior of real users. The SU learning component 116 leverages the value information to adjust the weighting values of the SU-analysis component that it is training. The PDA learning component 114 can apply a similar technique to generate and update at least some of the PDA-analysis component(s) 110, but without attempting to mimic the dialog-related behavior of real users. Subsection A.4 provides further details regarding the operation of the training system 108.

Overall, the environment 102 produces the trained PDA-analysis component(s) 110 in an autonomous manner, or at least a semi-autonomous manner, e.g., by eliminating or reducing the use of human experts and other manual operations. This provision allows a developer to quickly produce and update new PDA-analysis component(s) 110 when the need arises. The environment 102 also reduces the cost of generating and updating the new PDA-analysis component(s) 110. Finally, the environment 110 can generate a large corpus of training data in a short amount of time; this provision offers the potential of generating more accurate analysis components compared to known human-supervised training techniques.

Consider a yet more specific scenario in which the environment 102 proves particularly advantageous. Assume that a developer introduces a new application to the marketplace, or modifies an existing application such that it is effectively new. Further assume that the developer intends to allow users to interact with the new application via a personal digital assistant system. In prior practice, the developer will expend a great amount of expensive and time-consuming design effort in ensuring that the personal digital assistant system can correctly interpret the user's interaction with the new application. That design effort may involve the use of human experts to generate models, rules, etc., and may involve a test phase in which a selected group of real users interact with the application via the personal digital assistant system. The environment 102 can eliminate or reduce this effort via the self-learning strategy described above. Moreover, the environment 102 can accomplish this goal in the complete absence of empirical data that describes the interaction between real users and the new application. This allows the developer to quickly release the new application to the marketplace at low cost. The above-noted potential benefits are cited by way of example, not limitation.

A.2. An Illustrative SU Component

Figure 2:
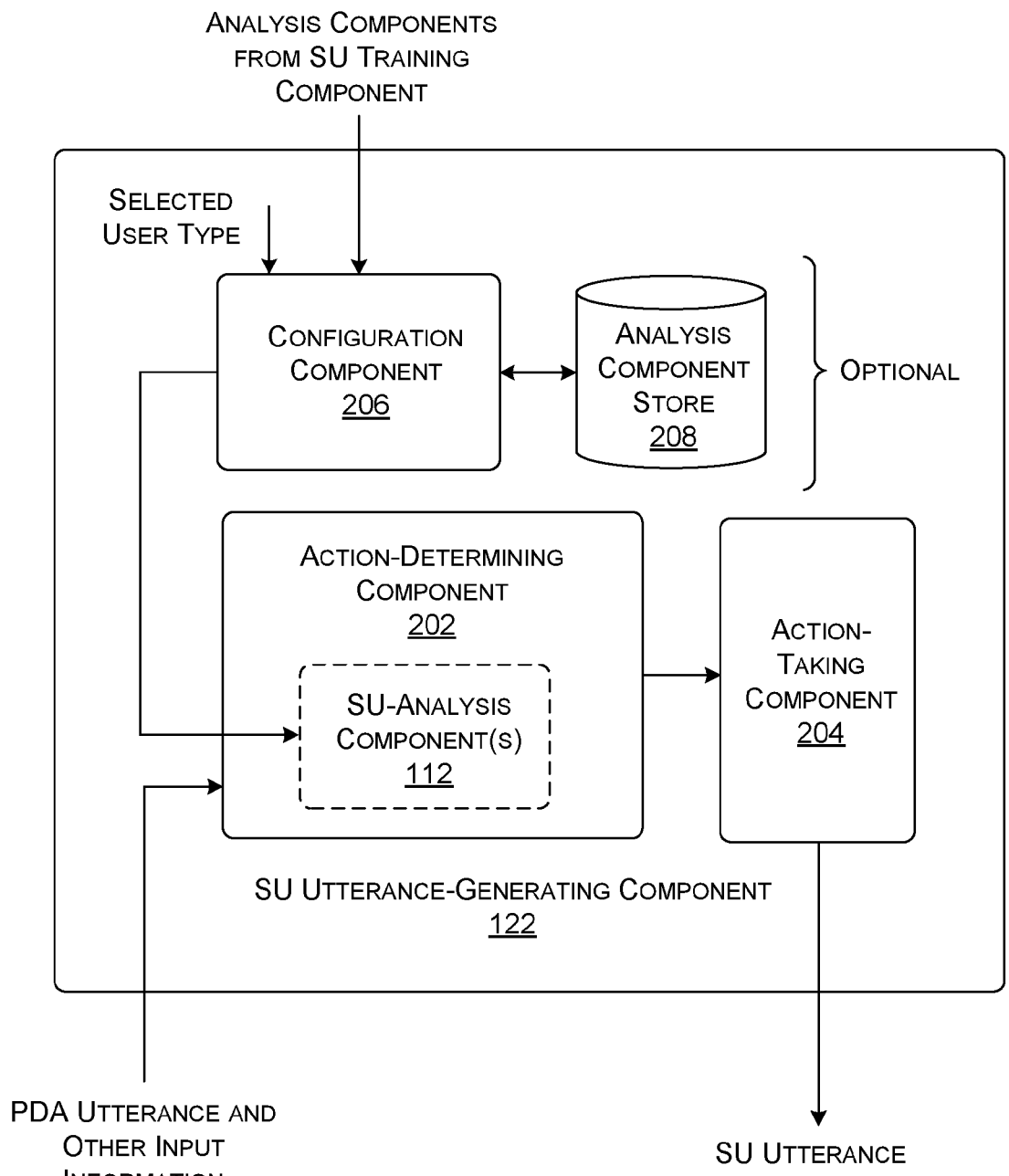
FIG. 2 shows one implementation of an SU utterance-generating component, which is a part of the SU component of FIG. 1.

FIG. 2 shows one implementation of the SU utterance-generating component 122, which is part of the SU component 106 of FIG. 1. The SU utterance-generating component 122 includes an action-determining component 202 which maps input parameter information (including the most recent PDA utterance, if any) into an SU utterance. An action-taking component 204 sends the SU utterance to the PDA component 104. In a first case, the action-taking component 204 sends the SU utterance in text form over a wired or wireless communication path to the PDA component 104. In a second case, the action-taking component 204 converts a text-based SU utterance into spoken form (using a text-to-speech synthesizer), and then outputs the SU utterance using a speaker. The PDA component 104 detects the SU utterance using one or more microphones that are placed in proximity to the SU component 106. In a third case, the action-taking component 204 converts a representation of the SU utterance into an audio waveform signal and then transfers that audio waveform signal to the PDA component 104 via any communication path, without the use of a text-to-speech synthesizer, speaker and complementary microphone(s). In the second and third cases, the PDA component 104 can detect the SU utterance by directly decoding the audio signal that is received. Further note that the audio signal can include a noise component that represents background noise, representing either real noise captured by a microphone (for the second case) or simulated noise produced by the action-taking component 204 (for the third case).

A configuration component 206 receives new and updated SU-analysis components from the training system 108 for storage in a data store 208. The configuration component 206 also loads an appropriate SU-analysis component from the data store 208 into the action-determining component 202. For instance, as a preliminary operation, prior to the start of a dialog, the configuration component 206 can load a particular SU-analysis component associated with a particular user type into the action-determining component 202. In other implementations, the configuration component 206 immediately loads any new or updated SU-analysis component that it receives from the training system 108 into the action-determining component 202.

Figure 3:
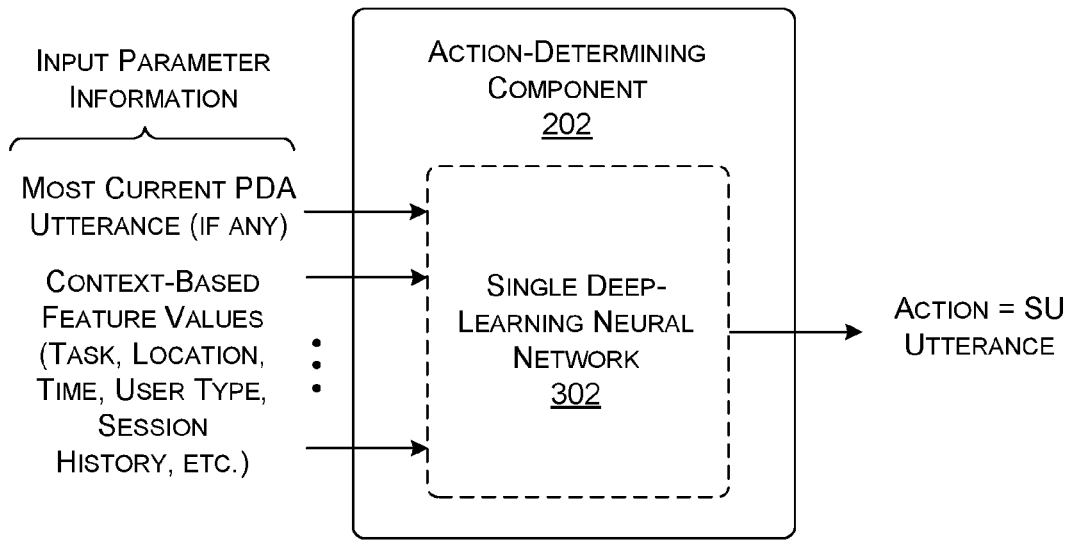
FIG. 3 shows one implementation of an action-determining component, which is a part of the SU utterance-generating component of FIG. 2.

FIG. 3 shows one implementation of the action-determining component 202 of FIG. 2. In this implementation, the action-determining component 202 uses a single deep-learning neural network 302 to map input parameter information into an SU utterance. In other words, as input, the neural network 302 receives a textual representation of a PDA utterance together with other context-based feature values described above, which collectively constitute the input parameter information. As output, the neural network 302 provides a text-based SU utterance. For example, assume that the input PDA utterance is, "What is the destination of your flight?" One particular manifestation of the neural network 302 might map this input parameter information into the SU utterance, "I am flying to Boston, via Logan Airport."

As will be described below with reference to FIG. 5, the neural network 302 can be composed of different layers that generally perform different respective functions or combinations of functions. In some implementations, for instance, at least one layer can convert a preliminary version of an SU utterance into a paraphrased SU utterance. For example, this neural network functionality can transform the preliminary version of an SU utterance to a more natural-sounding SU utterance, e.g., by converting "Myself flying to destination is Boston, airport is Logan" to "I am flying to Boston, via Logan Airport." Subsection A.4 provides additional details regarding one manner of training the neural network functionality which perform the paraphrasing function.

Figure 4:
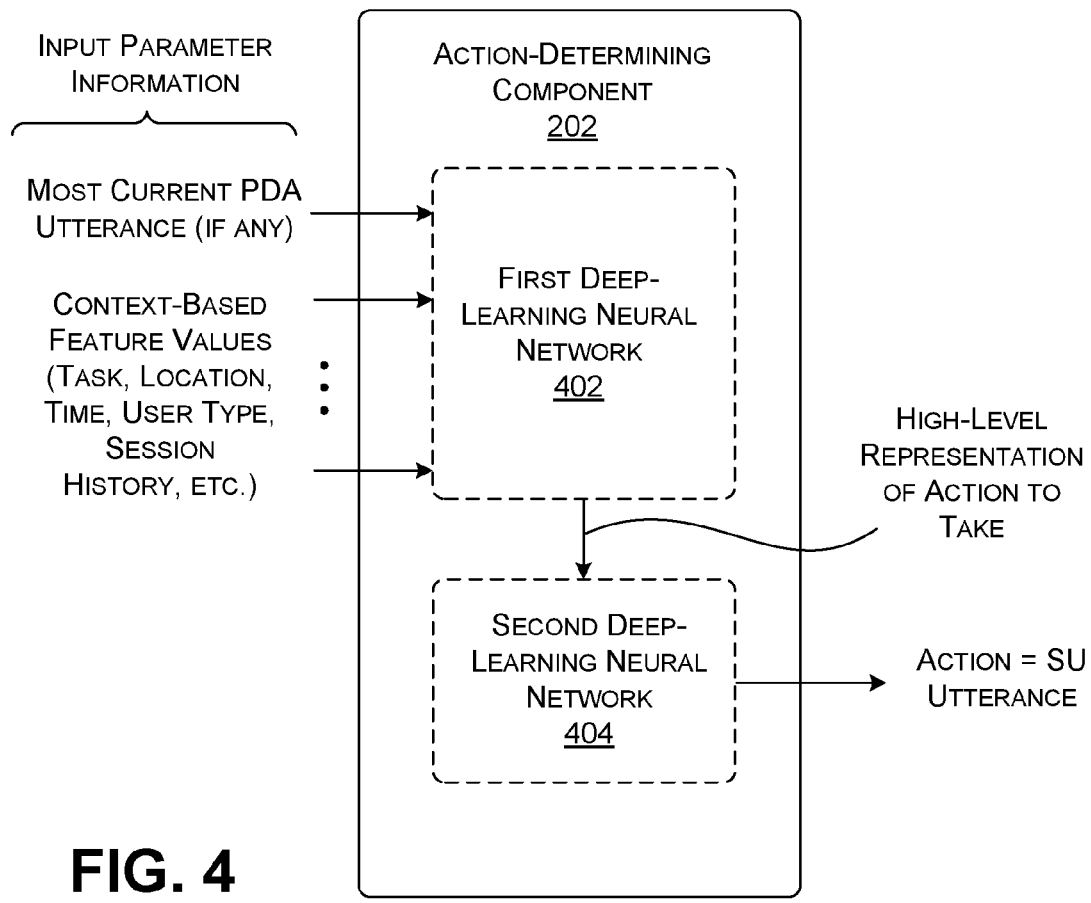
FIG. 4 shows another implementation of the action-determining component.

FIG. 4 shows another implementation of the action-determining component 202. In this implementation, the action-determining component 202 uses two or more deep-learning neural networks, arranged in series, to map input parameter information into an SU utterance. That is, as input, a first neural network 402 receives a text-based representation of a PDA utterance together with other context-based feature values described above, which collectively constitutes the input parameter information. The first neural network 402 maps the input parameter information into a representation of a high-level action to be taken. A second neural network 404 then maps the representation of the high-level action to be taken into an SU utterance. For example, again assume that the input PDA utterance is, "What is the destination of your flight?" One particular manifestation of the first neural network 402 might map this input parameter information into a high-level representation of the action to be taken, such as "arrival=BOS," meaning that the arrival destination is Logan International Airport in Boston (BOS), MA. The second neural network 404 then maps "arrival=BOS" into the natural language expression, "I am flying to Boston, via Logan Airport." In some implementations, the second neural network 404 can incorporate neural network functionality that additionally performs the above-described paraphrasing operation, e.g., by converting a preliminary version of an SU utterance into a more refined and natural-sounding SU utterance.

In another application of the structure shown in FIG. 4, the first neural network 402 generates a preliminary version of the SU utterance. The second neural network 404 converts the preliminary version of the SU utterance into a paraphrased SU utterance.

In still another implementation, the first neural network 402 can generate a high-level representation of the neural network (such as "arrival=BOS") and the second neural network generates a preliminary version of the SU utterance based on the high-level representation, such as "Myself flying to destination is Boston, airport is Logan." A third neural network (not shown) then converts the preliminary version of the SU utterance into a more refined version, such as "I am flying to Boston, via Logan Airport."

Still other implementations are possible. Further note that the paraphrasing functionality, in whatever manner implemented, can also generate an alternative version of an input utterance that is not necessarily "better" than the input utterance, but merely different.

Figure 5:
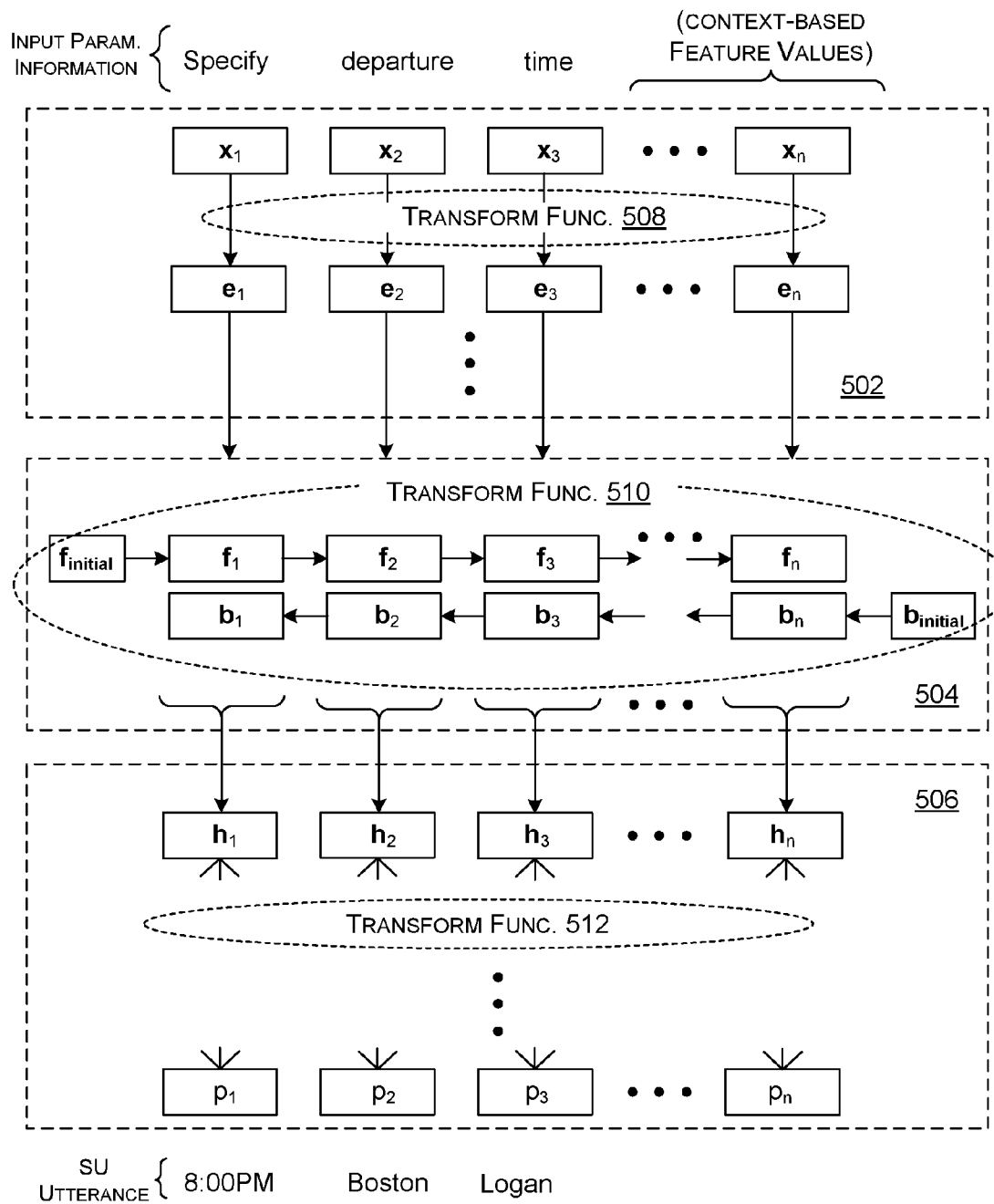
FIG. 5 shows one implementation of a neural network, which can be used to implement the action-determining component of FIG. 3.

FIG. 5 shows one implementation of the neural network 302 shown in FIG. 3. At the outset, it bears noting that the implementation shown in FIG. 5 is cited in the spirit of illustration, not limitation; other implementations can use other types of neural networks compared to that shown in FIG. 5, examples of which are provided below. Still other implementations can use other types of machine-learned models (not necessarily neural networks). Still other implementations can use one or more rule-application engines. Still other implementations can use any combination of the above-described technologies.

The illustrative neural network 302 shown in FIG. 5 receives an input PDA utterance that reads, "Specify departure time." The input PDA utterance also receives a collection of context-based feature values, such as task ID, user type ID, the time, the location, the current dialog state, and so on. Assume that the neural network 302 maps the above-described input parameter information into the illustrative SU utterance, "8:00 PM Boston Logan." Here, although the SU component 106 has not been explicitly prompted to provide the destination of a flight, it proactively provides that information. In so doing, the SU component 106 approximates the behavior of some users who are known to combine multiple information items into a single SU utterance.

The neural network 302 includes at least three parts (502, 504, 506) which perform different respective main functions. A first part 502 begins by expressing the tokens (e.g., words) associated with the input parameter information as a series of input word vectors $\{x_1, x_1, \ldots, x_n\}$, where n represents the total number of tokens in the input parameter information. For example, the first part 502 can express each word in the input PDA utterance (here, "Specify departure time") and each context-based metadata feature value as a one-hot vector. A one-hot vector has a series of dimensions associated with respective words in a vocabulary V of size |V|. The one-hot vector has a value of 1 for that dimension of the vector that is associated with the specific word that it represents. All remaining dimensions in the one-hot vector are set to 0. (The roles of 0 and 1 can be alternatively reversed, such that 0 indicates the presence of a word and 1 indicates the absence of the word.)

Next, transformation functionality 508 can optionally use a word hashing technique to transform each one-hot vector $x_i$ into a word-embedding vector $e_i$ of reduced dimensionality (compared to the one-hot vector $x_i$). For example, consider the word "departure" in the input PDA utterance. The word hashing technique can form a letter-trigram representation of that word by moving a three-letter window across the word to produce a succession of three-letter character groupings, e.g., to produce "dep", "epa", "par," etc. The word hashing technique then forms a letter-trigram word vector for each word that expresses the particular letter-trigrams that appear in the word. More specifically, each letter-trigram word vector has a number of dimensions corresponding to the total number of three-letter sequences that may appear in a particular natural language, such as English. The word hashing technique forms a letter-trigram word vector for a particular word by counting the number of letter-trigrams of each particular type that appear in the word, and then setting values, at corresponding dimensions in the vector, to reflect those counts. For example, the word "departure" would include a 1 value entry for each of the trigrams described above ("dep", "epa", "par", etc.), and a 0 value entry for all other dimensions, or vice versa. If a particular letter-trigram appears more than once in a particular word, then the count for that dimension would reflect how many times that letter-trigram appears in the word.

Altogether, the transformation functionality 508 produces a collection of word-embedding vectors $\{e_1, e_2, \ldots, e_n\}$. (As a general footnote, throughout the description of FIG. 5, the subscript n is used as a matter of convenience; in actual practice, any instance of transformation functionality can convert $n_1$ input vectors into $n_2$ output vectors (or scalars), where $n_2$ can be greater, equal to, or less than $n_1$.)

The second part 504 of the neural network 302 uses transformation functionality 510 to transform the collection of embedding vectors $\{e_1, e_2, \ldots, e_n\}$ into a collection of state vectors $\{h_1, h_2, \ldots, h_n\}$. Each state vector $h_i$ captures the context of a token in the input parameter information with respect to other tokens in the input parameter information. In other words, each state vector $h_i$ associated with a particular token $token_i$ in the input parameter information reflects information about neighboring tokens in the input parameter information.

More specifically, the second part 504 generates the state vectors $\{h_1, h_2, \ldots, h_n\}$ using a recurrent neural network (RNN). In the specific (and non-limiting) case shown in FIG. 5, the second part 504 generates the state vectors $\{h_1, h_2, \ldots, h_n\}$ using a bi-directional RNN. The bi-directional RNN includes forward-sequence processing and back-sequence processing. In the forward-sequence processing, with respect to a given word in the input parameter information, the influence of the preceding word in the input parameter information is taken into account. In the backward-sequence processing, the influence of the subsequent word in the input parameter information is taken into account.

The transformation functionality 510 represents whatever transformation operations that the second part 504 uses to convert the embedding vectors into a collection forward-sequence vectors $\{f_1, f_2, \ldots, f_n\}$ and a collection of backward-sequence vectors $\{b_1, b_2, \ldots, b_n\}$. In one non-limiting implementation, the transformation functionality 508 uses the following two equations to compute each $f_i$ and $b_i$, respectively:

$$f_i = g(w_{xf}e_i + W_{ff}f_{i-1}) \quad (1), \text{ and}$$

$$b_i = g(W_{xb}e_i + W_{bb}b_{i+1}) \quad (2).$$

In Equation (1), note that the value of a forward-sequence vector $f_i$ for $token_i$ is based on the word-embedding vector $e_i$ for $token_i$ together with the forward-sequence vector $f_{i-1}$ associated with a preceding token ($token_{i-1}$) in the input parameter information. In Equation (2), the value of a backward-sequence vector $b_i$ for $token_i$ is based on the embedding vector $e_i$ for $token_i$, together with the backward-sequence vector $b_{i+1}$ associated with the subsequent token ($token_{i+1}$) in the input parameter information. The forward-sequence vector $f_{initial}$ shown in FIG. 5, preceding the forward-sequence vector $f_1$, provides initialization values, such as, optionally, a series of 0 values. Similarly, the back-sequence vector $b_{initial}$ subsequent to the backward-sequence vector $b_n$, provides initialization values, such as a series of 0 values. The symbols $W_{xf}$, $W_{ff}$, $W_{xb}$, and $W_{bb}$ represent respective matrices of weighting values to be learned in the preliminary training phase. The function symbol g( ) represents some environment-specific activation function, such as a logistic hyperbolic tangent function (e.g., tan h) or a sigmoid function, etc.

The transformation functionality 510 next generates the collection of state vectors $\{h_1, h_2, \ldots, h_n\}$ based on the collection of forward-sequence vectors $\{f_1, f_2, \ldots, f_n\}$ and backward-sequence vectors $\{b_1, b_2, \ldots, b_n\}$. The transformation functionality 510 can use different approaches to perform this computation. In one case, the transformation functionality 510 concatenates each $f_i$ with its corresponding $b_i$ to produce $h_i$. In another case, the transformation functionality 510 adds $f_i$ and $b_i$ together to produce $h_i$, and so on.

The third part 506 of the neural network 302 optionally transforms the state vectors $\{h_1, h_2, \ldots, h_n\}$ into a collection of output values $\{p_1, p_2, \ldots, p_n\}$, which map to respective output tokens. That is, the third part 506 can convert the state vectors to vectors or scalars which map to words in the SU utterance, here, corresponding to the phrase, "8:00 PM Boston Logan." In one non-limiting implementation, the third part 506 can provide each output value $p_i$ based on the transformation, $p_i = W_{yh} h_i$, where $W_{yh}$ corresponds to a set of weighting values provided by the training system 108. In another implementation, the third part 506 can use any type of feedforward neural network having any number N of layers. The values $z_j$ in any layer j in this feedforward neural network can be given by the formula, $z_j = f(W_j z_{j-1} + b_j)$, for j=2, ... N. The symbol $W_j$ denotes the j-th weight matrix produced by the training system 108, and the symbol $b_j$ refers to an optional j-th bias vector, also produced by the training system 108. The function $f(x)$ corresponds to any activation function, such as the tan h function. In another implementation, the third part 506 can correspond to another RNN having any configuration (examples of which are provided below), and/or any other type of neural network. The transformation functionality 512 generally represents whatever computation(s) are used to generate the output values $\{p_1, p_2, \ldots, p_n\}$.

In some implementations, among other functions, the transformation functionality 512 can transform a preliminary version of the SU utterance into a paraphrased SU utterance. In other words, one layer of neurons in the third part 506 can represent the preliminary version of the SU utterance. A final layer of neurons in the third part 506 can represent the paraphrased version of the SU utterance.

To repeat, the architecture of the neural network 302 shown in FIG. 1 can be varied in any way. For example, the neural network 302 can use just a deep-learning feedforward network without an RNN component. In other words, the neural network 302 can use the first part 502 and the third part 506 of the neural network 302 of FIG. 5 to generate the SU utterance, without the second RNN part 504.

In addition or alternatively, the neural network 302 can include one or more instances of convolutional functionality. An instance of convolutional functionality slides a window having a length of g input vectors across the sequence of input vectors, to generate a set of window vectors, e.g., by concatenating the g input vectors in each window to produce a respective group window vector. The neural network 302 can then perform any subsequent processing on the set of window vectors.

In addition, or alternatively, the neural network 302 can include one or more instances of pooling functionality. An instance of pooling functionality transforms a set of input vectors into a set of output vectors or scalars by selecting pieces of the input vectors to form the output vectors (or scalars). For example, an instance of max-pooling functionality can select the maximum value in each input vector to form a corresponding output value.

In addition, or alternatively, the neural network 302 can include any alternative recurrent neural network (RNN) connection strategy. For instance, the neural network 302 can use forward-sequence processing but not backward-sequence processing. Or the neural network 302 can use backward-sequence processing but not forward-sequence processing. In addition, or alternatively, the neural network 302 can use "look-around" connection strategy in which the last vector in a series feeds into the first vector of the series, or vice versa. In addition, or alternatively, the neural network 302 can include two or more layers of RNNs having any respective architectures.

In addition or alternatively, the neural network 302 can use any type of architecture that employs gates and/or memory cells. For example, in a Long-Short-Term-Memory (LSTM) architecture, the neural network 302 can be constructed using a plurality of LSTM units. Each LSTM unit can use one or more gates to control the receipt of new information into the LSTM unit, one or more gates to control the retention of information in the LSTM unit, one or more gates to control the output of information from the LSTM unit, and so on. Another architecture that employs gates is referred to as a gated recurrent unit (GRU) RNN. More generally, the neural network 302 can employ any type of gating architecture to address the vanishing gradient problem, in which relevant context information in the input parameter information is not effectively utilized due to its positional relationship to other parts of the input parameter information.

In addition or alternatively, the neural network 302 can be combined with one or more additional neural networks and/or other statistical machine-trained models and/or rule-application engines. For example, as described in connection with FIG. 3, the neural network 302 can generate a preliminary version of the SU utterance. A "downstream" neural network (not shown) can convert the preliminary version of the SU utterance into a paraphrased SU utterance.

The training system 108 can train the above-described paraphrasing functionality as a part of its training of the overall neural network 302 (as described in Subsection A.4), without separately training the paraphrasing functionality per se. In another implementation, the training system 108 can separately train the paraphrasing functionality at least in an initial bootstrapping operation, also described in Subsection A.4. The initial bootstrapping operation can rely on a set of training examples, wherein each example maps an input utterance to a paraphrased utterance. In another implementation, the environment 102 can use a preconfigured machine-trained paraphrasing model, rather than creating such a model from "scratch" based on training examples.

Now referring to the implementation of FIG. 4, the first neural network 402 of FIG. 4 can use the same architecture described above with reference to FIG. 5, or a different architecture. Likewise, the second neural network 404 can use the same architecture described above with reference to FIG. 5, or a different architecture. The training system 108 can train the second neural network 404 based on a corpus of training examples, wherein each training example maps a high-level representation of an action to a natural SU utterance. The training system 108 can potentially obtain these examples from an application outside the realm of personal digital assistant systems. For example, the training system 108 can rely on a text-based corpus which maps index information to related sentences. In another implementation, the environment 102 can use a preconfigured machine-trained model as the second neural network 404, rather than independently training a new model.

A.3. An Illustrative PDA Component

Figure 6:
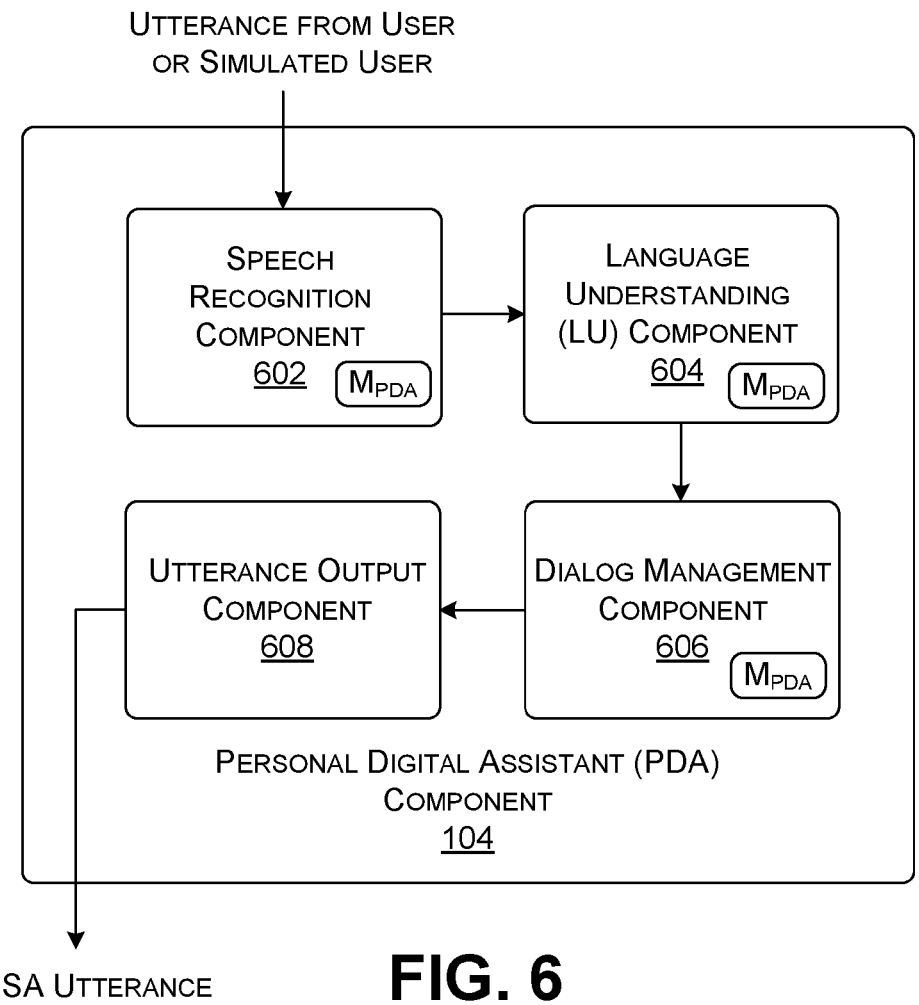
FIG. 6 shows one implementation of the PDA component of FIG. 1.

FIG. 6 shows one implementation of the PDA component 104 of FIG. 1. The PDA component 104 can correspond to any commercial or custom-built personal digital assistant functionality, such as the CORTANA personal digital assistant functionality produced by MICROSOFT Corporation of Redmond, Wash.

In one implementation, the PDA component 104 includes four principal parts. As a first part, a speech recognition component 602 receives an input signal from one or more audio input devices (not shown). In some cases, for instance, that input signal expresses an input SU utterance as an audio waveform signal, either captured by one or more microphones, or directly received from the SU component 106 via any kind of communication path. The speech recognition component 602 uses a PDA-analysis component to convert the input signal into recognized speech information. The speech recognition component 602 can use any PDA-analysis component to perform this task, such as a deep-learning neural network of any type. In other cases, however, the user (or a simulated user) provides input in text form; if so, the PDA component 104 omits use of the speech recognition component 602.

In a second part, a language understanding (LU) component 604 uses one or more PDA-analysis components to interpret the SU utterance. Additional information regarding different implementations of the LU component 604 is set forth below with respect to FIGS. 7-9. The LU component 604 outputs an interpreted SU utterance.

In a third part, a dialog management component 606 uses one or more PDA-analysis components to track the state of the ongoing conversation and to map the SU utterance into a PDA utterance. The PDA utterance represents the PDA component's response to the SU utterance. In one implementation, the dialog management component 606 can use a neural network of the same architecture shown in FIG. 5 to perform its mapping operation. The neural network can also incorporate the same kind of paraphrasing functionality as the SU component 106, e.g., by mapping a preliminary version of a PDA utterance into a paraphrased PDA utterance. That paraphrasing functionality can be implemented as a part of a single neural network or as a separate neural network that is dedicating to the paraphrasing task. Alternatively, or in addition, the dialog management component 606 can use a rule-application engine to perform its mapping operation.

In a fourth part, an utterance output component 608 converts the PDA utterance generated by the dialog management component 606 into an appropriate output form, and then sends the converted PDA utterance to the real human user or the SU component 106. For example, the utterance output component 608 can use a text-to-speech synthesizer to convert a text-based indication of the PDA utterance into audio form. In addition, or alternatively, the utterance output component 608 can generate and render other information, such as accompanying text messages, images, hyperlinks, software buttons, etc. A user-side user interface presentation can present this additional information to a real user in the course of interacting with the PDA component 104. The SU component 106 can also take the additional information (if generated) into account in the course of generating its SU utterances, e.g., as additional input parameter information.

Figure 7:
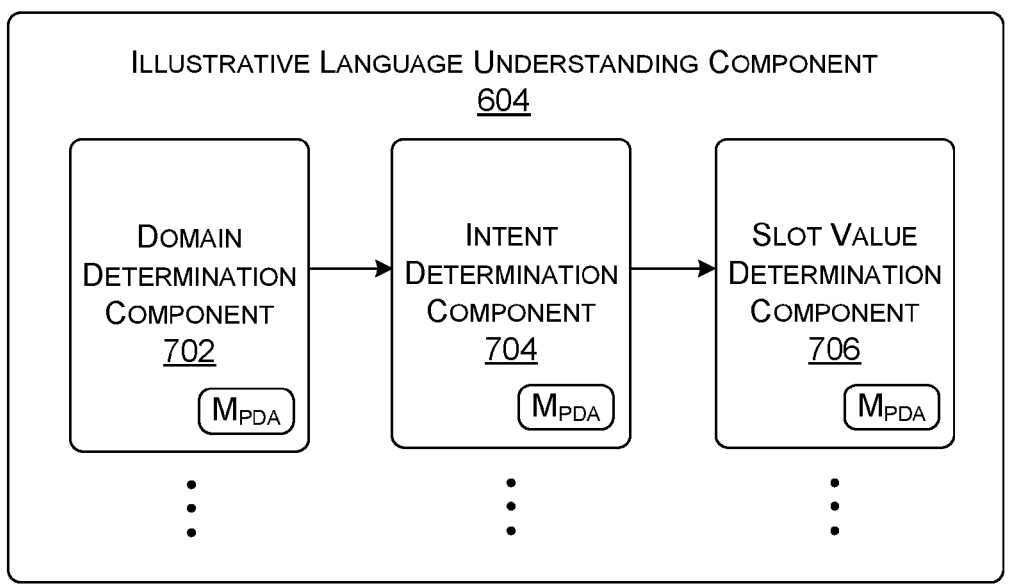
FIG. 7 shows one implementation of a language understanding (LU) component, which is part of the PDA component of FIG. 6.

FIG. 7 shows one implementation of the language understanding (LU) component 604 of FIG. 6. The LU component 604 includes at least one domain determination component 702, at least one intent determination component 704, and at least one slot value determination component 706. In some implementations, for instance, the LU component 604 corresponds to a basic unit of analysis, and the PDA component 104 includes plural instances of that basic unit for different respective domains. A domain pertains to the general theme to which an input utterance pertains, which may correspond to a set of tasks handled by a particular application, or a subset of those tasks. For example, the command "find Mission Impossible" pertains to a media search domain.

More specifically, the domain determination component 702 determines the most probable domain associated with the input utterance. The intent determination component 704 determines an intent associated with the input SU utterance. An intent corresponds to an objective that a user likely wishes to accomplish by submitting an input utterance. For example, a user who submits the command "find Mission Impossible" intends to find a particular movie having the name of "Mission Impossible." A user who submits the command "buy Mission Impossible" intends to purchase the movie "Mission Impossible," and so on. The slot value determination component 706 determines slot values in the input utterance. The slot values correspond to information items that an application needs to perform a requested task, upon interpretation of the input utterance. For example, the command, "find Jack Nicolson movies in the comedy genre" includes a slot value "Jack Nicolson," that identifies an actor having the name of "Jack Nicolson," and a slot value "comedy," corresponding to a requested genre of movies.

Any of the domain determination component 702, intent determination component 704, and slot value determination component 706 can use any technology to perform their respective functions. For example, any of these components (702, 704, 706) can use one or more machine-learned (statistical) models. To cite merely one illustrative and non-limiting case, the domain determination component 702 may correspond to a machine-learned classification model, such as a linear model, a deep-learning neural network model (such as the neural network 302 shown in FIG. 5, or part thereof), a clustering-based model, a decision tree model, a support vector machine model, and so on. The intent determination component 704 can likewise correspond to any of these kinds of models.

The slot value determination component 706 may correspond to a machine-learned Conditional Random Field (CRF) model. In this approach, a CRF model provides the most probable slot sequence defined by:

$$\hat{Y} = \underset{Y}{\operatorname{argmax}} p(Y \mid X). \tag{3}$$

In this equation, the term X refers to a sequence of tokens in a detected linguistic item $(x_1, x_2, \ldots, x_T)$ and Y refers to a sequence of tags $(y_1, y_2, \ldots, y_T)$ assigned to the tokens, where the tags are selected from a set C of possible tags. The tags correspond to slot variables, such as, in the media search domain, the tags, "actor name," "release date," "genre," etc. In the above example, the CRF model would determine that the term "Jack Nicolson" corresponds to an actor name, having the particular value "Jack Nicolson."

Alternatively, or in addition, any of the domain determination component 702, the intent determination component 704, and/or the slot value determination component 706 can use a rule-application engine to perform its respective analysis. For example, any of these components (702, 704, 706) can apply rules which maps certain keywords in an input utterance into appropriate classification results. For instance, the intent determination component 704 can apply a rule that indicates that any input utterance that matches the template "buy <x>" refers to an intent to buy a particular product, where that product is identified by the value of variable x.

Figure 8:
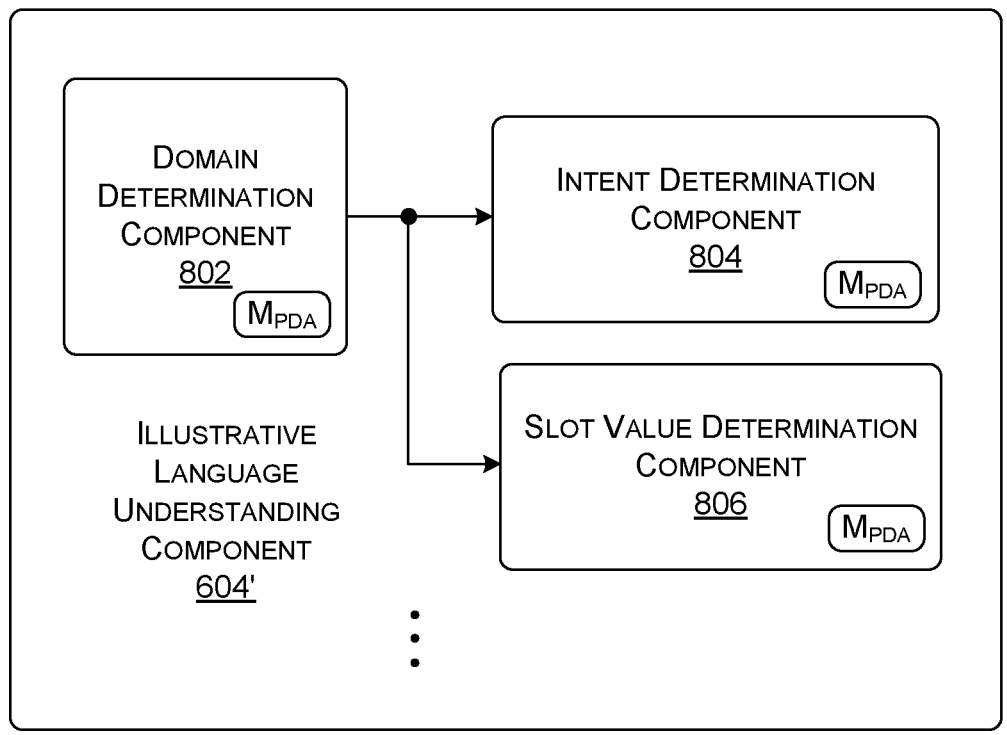
FIG. 8 shows another implementations of the LU component.

FIG. 8 shows another LU component 604' that includes a domain determination component 802, an intent determination component 804, and a slot value determination component 806. The LU component 604' has the same construction and operation as the LU component 604 of FIG. 7, except that, in FIG. 8, the intent determination component 804 performs its operation in parallel with the slot value determination component 806, instead of in series.

Figure 9:
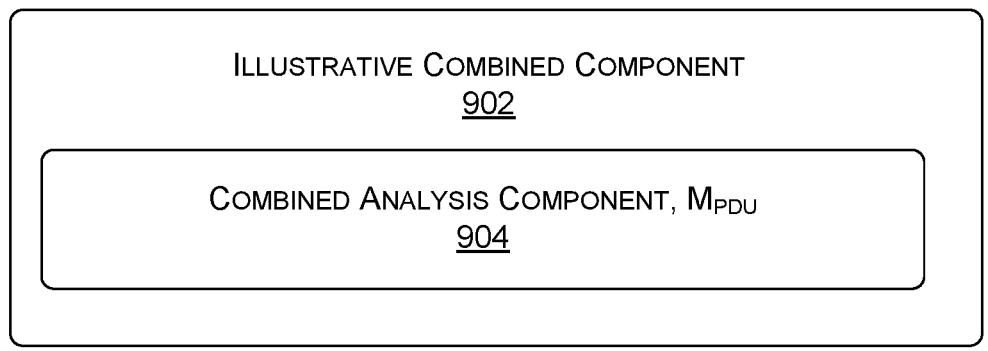
FIG. 9 shows a combined component having an analysis component which combines functions of two or more of the components of the PDA component of FIG. 6.

FIG. 9 shows a combined component 902 that that combines the functions of two or more components of the PDA component 104 shown in FIG. 6, such as the speech recognition component 602, the domain determination component (702, 802), the intent determination component (704, 804), the slot value determination component (706, 806), and the dialog management component 606, or some subset thereof. The combined component 902 uses a combined analysis component 904 to perform the above-described combined analysis. The combined analysis component 904, in turn, can use any of the above-described technology to perform its analysis, such as a statistical machine-learned model, a rule-application engine, etc., or any combination thereof. In the case of a machine-learned model, the training system 108 produces a combined analysis model that is trained to perform all (or a subset) of the above-described functions of the above-mentioned components, e.g., by using a single integrated transformation to convert an SU utterance and associated context-based feature values into a PDA utterance.

A.4. An Illustrative Training System

Figure 10:
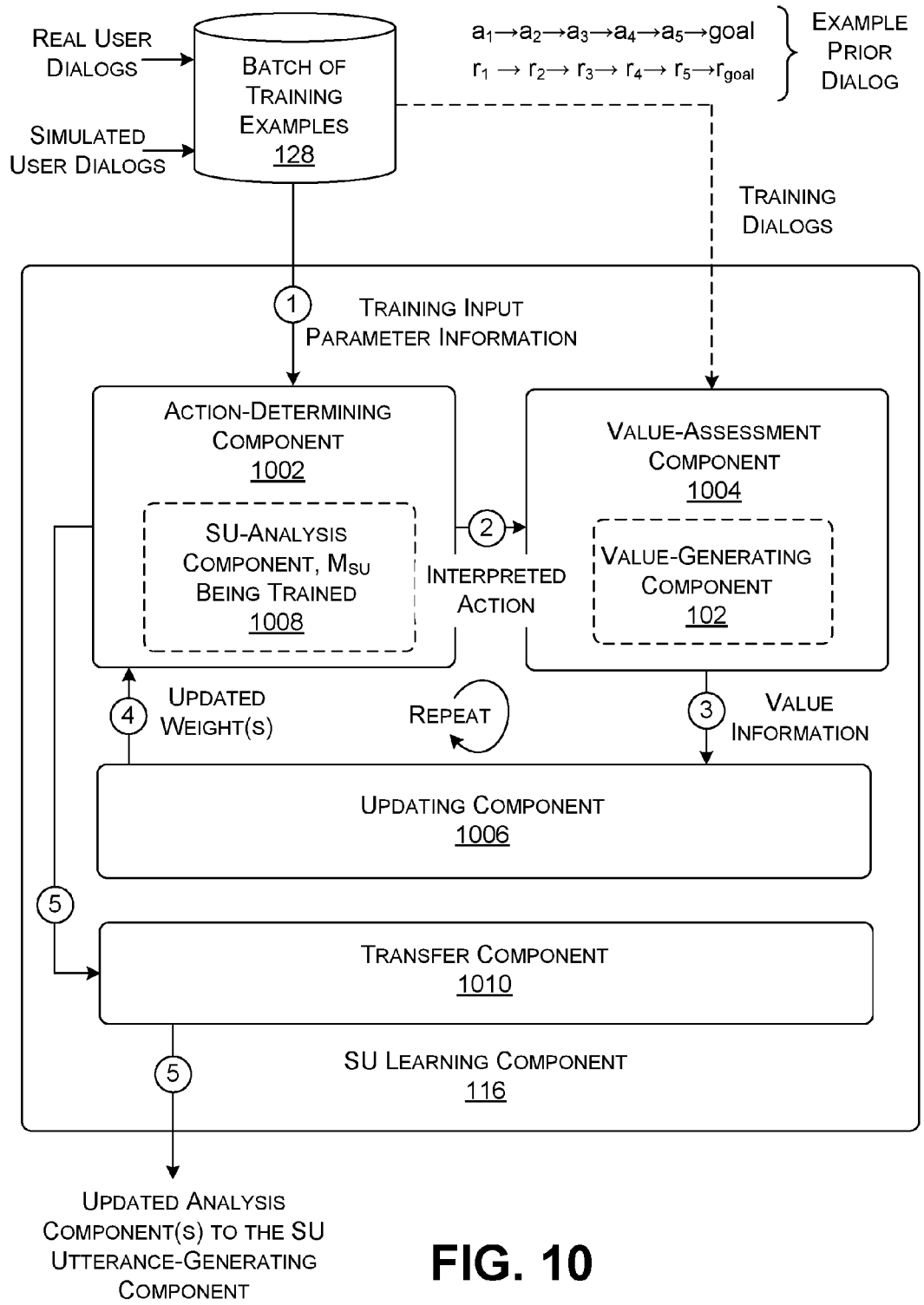
FIG. 10 shows one implementation of an SU learning component, which is part of the training system of FIG. 1.

FIG. 10 shows one implementation of the SU learning component 116 of FIG. 1, which is part of the training system 108. In one implementation, the SU learning component 116 trains the SU-analysis component(s) 112 based on a corpus of training data provided in the data store 128.

The training data can include prior simulated dialogs between the SU component 106 and the PDA component 104. The training data can describe each dialog by specifying the utterances exchanged between the SU component 106 and the PDA component 104 over multiple turns. A turn refers to a stage in a dialog, typically in which one or more information items are provided to the PDA component 104 by the SU component 106. The training data also specifies the input parameter information that is pertinent to each utterance that has been made. For example, with respect to an SU utterance made by the SU component 106, the input parameter information specifies a preceding PDA utterance (if any) made by the PDA component 104, and other context-based feature values (task ID, user type ID, dialog state information, time, location, etc.). The training data also specifies the outcome of each dialog; more specifically, a dialog may end in either the successful completion of the task to which it is directed, or an aborted attempt by the SU component 106 to complete the task.

The training data can also include prior "real" dialogs between actual human users and the PDA component 104, e.g., by mixing simulated dialogs with the real dialogs. The SU learning component 116 can also optionally leverage these real dialogs during an initial phase in which the environment 102 of FIG. 1 has yet to collect sufficient training data obtained through the use of the SU component 106. But such bootstrapping data is not necessary; in another implementation, for instance, the SU leaning component 116 can start "cold" with no initial training data, even though its performance can be expected to be poor when it first begins learning, due the presence of noisy output data. Generally, to facilitate explanation, the following description will sometimes make reference to training data associated with simulated dialogs (involving the SU component 104); but in each such case, note that real dialogs could be used instead, or in addition. Further note that additional detail regarding the early stages of training is provided at the end of this subsection.

The training data can also optionally include paraphrased SU utterances and/or paraphrased PDA utterances. Each instance of such data can include an input version of an utterance and one or more paraphrased versions of the utterance. The training system 108 can obtain the paraphrased utterances from various sources, such as humans, a separate machine-trained paraphrasing model, a personal digital assistant system, one or more applications outside the context of personal digital assistant systems, and so on, or any combination thereof.

From a high-level perspective, the SU learning component 116 can use a reinforcement learning technique to generate the SU-analysis component(s) 112. In one implementation, the SU learning component 116 attempts to maximize the following objective function ($O_{SU}$), over all dialogs in the training data (or some portion thereof), and with respect to all of the tasks (or some portion thereof):

$$O_{SU}=w_1*\text{UserSimilarity}+w_2*\text{TaskEfficiency} \qquad (4).$$

In this function, the UserSimilarity measure refers an extent to which the behavior of the SU-analysis component(s) 112 resembles the behavior of a range of actual (real human) users. More precisely, the UserSimilarity measure implicitly has two dimensions: first, this measure attempts to determine the extent to which the behavior of the SU-analysis component(s) 112 resembles the behavior expressed by real users in general; second, this measure specifically attempts to determine the extent to which the behavior of the SU-analysis component(s) 112 resembles the behavior of a diversity of real users, not just one type of real user. The TaskEfficiency measure refers to the extent to which the SU-analysis component(s) 112 efficiently reach successful outcomes. Each of the UserSimilarity and TaskEfficiency measures, in turn, can correspond to a set of distinct variables. For example, the UserSimilarity measure can include different variables that reflect the extent to which the dialogs produced by the SU-analysis component(s) 112 resemble different aspects of the behavior of real users. Likewise, the TaskEfficiency measure can have different variables that measure the extent to which the dialogs produced by the SU-analysis component(s) 112 exhibit different dimensions of efficiency. The parameters $w_1$ and $w_2$ correspond to weighting values which determine the relative importance of the UserSimilarity measure compared to the TaskEfficiency measure. Note that each of the parameters $w_1$ and $w_2$ can include a set of weighting values for weighting individual components of the UserSimilarity and TaskEfficiency measures, respectively.

The goal of maximizing the TaskEfficiency measure is to promote quick and efficient completion of tasks. This goal is appropriate because the objective of the training is to produce SU-analysis component(s) 112 that mimic the behavior of real users, who naturally strive to efficiently complete tasks in many cases. The goal of maximizing the UserSimilarity measure is to accurately capture the sometimes imperfect behavior of a range of real users. This goal is important because, although real users generally wish to efficiency complete tasks, they often do so in a non-optimal and sometimes idiosyncratic manner. The objective of SU-analysis component(s) 112 is to mimic the behavior of a range of real users, not a single type of super-human user.

Note that the UserSimilarity measure can work against the TaskEfficiency measure, and vice versa. For example, a dialog is the most efficient when the SU component 106 provides all the information items that are necessary to complete a task in a single SU utterance. But most real users do not interact with their PDA components in this manner. Hence, the UserSimilarity measure can discount any dialog which captures this behavior, even though the TaskEfficiency measure may attach a high value to this behavior. To repeat, the weighting parameters $w_1$ and $w_2$ control the relative importance of the UserSimilarity measure relative to the TaskEfficiency measure; this enables a developer to determine the final characteristics of the SU-analysis component(s) 112 that are produced. One developer may be more concerned with task efficiency compared to user similarity, for instance.

The UserSimilarity measure may be based on empirical information extracted from actual training dialogs between real users and the PDA component 104. For example, as with be clarified in the context of FIG. 11, an optional user type-identifying comment 1102 can determine different clusters of user behavior within a corpus of training data. The user type-identifying component 1102 can also extract statistical information which summarizes the main behavioral characteristics of each such cluster. To cite one example, one such instance of statistical information can reflect an average number of turns that a certain type of users takes to complete a dialog, along with any variance measures. The UserSimilarity measure can leverage this statistical information, e.g., by comparing information associated with a particular dialog under consideration with statistical information associated with a particular type of user, e.g., by determining the difference between the behavior exhibited in the particular dialog under consideration and the target behavior of the particular type of user.

Alternatively, or in addition, the UserSimilarity measure can provide generalized constraints that do not necessarily derive from empirical sources in a direct manner. For example, the UserSimilarity measure can include a constraint that specifies that dialogs for a certain task and a certain user type should preferably include between three to six turns. A developer can specify this constraint based on an ad hoc estimate of the target group's behavior; the estimate may not directly correspond to a statistical summary of a corpus of historical data. The SU learning component 116 can rely on a non-empirical UserSimilarity measure particularly in the case in which a large amount of empirical information is not yet available. There may be a paucity of empirical data, for instance, when a new application (associated with a new domain) is introduced into the marketplace; real users will not yet have had an opportunity to interact with their PDA components with respect to this new domain.

Now referring to the specifics of FIG. 10, an action-determining component 1002, a value-assessment component 1004, and an updating component 1006 collectively train an SU-analysis component 1008 in a manner which conforms to the above-described objective function. A transfer component 1010 then transfers the SU-analysis component 1008 to the SU utterance-generating component 122 shown in FIG. 2. The SU utterance-generating component 122 uses that SU-analysis component 1008 (labeled in FIG. 2 as the SU-analysis component(s) 112) to interact with the PDA component 104, and, in the process, generate additional training data.

In one implementation, the SU learning component 116 operates on a batch of new training data in the data store 128 on a periodic basis, such as at the end of every day, or week, or month, etc. In another approach, the SU learning component 116 continually updates the SU-analysis component 1008 in a piecemeal manner as new training data is received (e.g., in tandem with the interaction between the SU component 106 and the PDA component 104 within the environment 102).

The action-determining component 1002 corresponds to the training-version counterpart of the action-determining component 202 of FIG. 2. The action-determining component 1002 receives input parameter information, corresponding to any turn in which a user (or a simulated user) has made an utterance, or a hypothetical situation in which the user (or a simulated user) is presumed to have made an utterance. In some cases, the input parameter information can include a preceding PDA utterance to which the user or simulated user is responding. In other cases, the input parameter information does not include a PDA utterance; here, the user or simulated user may have made (or is presumed to have made) an utterance to initiate a dialog or otherwise proactively provide information or ask a question to the PDA component 104, etc. But to simplify explanation, assume in the following explanation that the input parameter information fed to the action-determining component 1002 specifies a PDA utterance and other context-based feature values (e.g., task ID, user type ID, dialog state information, location, time, etc.).

The SU learning component 116 can obtain the input parameter information from different sources. In one case, the SU learning component 116 obtains a sample instance of input parameter information from examples of input parameter information associated with dialogs between real users and the PDA component 104. In another case, the SU learning component 116 obtains a sample instance of input parameter information from examples of input parameter information associated with simulated dialogs between the SU component 106 and the PDA component 104. In another case, the SU learning component 116 constructs a sample instance of input parameter information that incorporates, in part, a paraphrase utterance provided in the data store 128. That paraphrase utterance (e.g., a paraphrased input PDA utterance) can originate from any source mentioned above. In another case, the SU learning component 116 generates random input parameter information using a process that is the counterpart of the scenario-selecting component 118 of FIG. 1. The SU learning component 116 can randomly generate a PDA utterance in any manner, e.g., by randomly selecting a PDA utterance from a stock corpus of PDA utterances, and then randomly picking slot values for use in the selected PDA utterance, or by automatically generating the PDA utterance using a machine-trained paraphrasing model, etc.

The action-determining component 1002 maps the input parameter information into a particular action, corresponding to a particular SU utterance, referred to herein as an estimated SU utterance. To be more concrete, assume that the input PDA utterance corresponds to the question, "What time is your arrival," and the estimated SU utterance corresponds to the phrase, "8:00 PM at Boston, Logan." The action-determining component 1002 can use the same neural network 302 shown in FIG. 5, or any other statistical machine-learning component, to perform the above-described mapping. In that context, the SU-analysis component 1008 refers to the weighting parameters of the neural network 302 at any given time in the training process.

More specifically, at any stage in a training operation, the SU-analysis component 1008 reflects an input-to-action mapping policy π. The input-to-action mapping policy reflects the manner in which the SU-analysis component 1008 maps instances of input information into estimated SU utterances. In the above example, for instance, the input-to-action mapping policy determines that the input PDA utterance "What is your time of arrival" should be mapped to the estimated SU utterance, "8:00 PM at Boston, Logan." The input-to-action mapping policy at any given time is determined by the weighting values of the SU-analysis component 1008 at that time.

The value-assessment component 1004 determines a value associated with the estimated utterance generated by the action-determining component 1002. The value generally corresponds to a total reward that the interpreted action is expected to accrue, measured from the current state of the dialog (in which the estimated SU utterance is assumed to occur) to the dialog's projected completion, assuming that the current input-to-action mapping policy π is followed.

For instance, assume that the estimated SU utterance "8:00 PM at Boston, Logan" is assumed to occur in a third turn of a dialog, in the context of a particular task, location, time, and user type. The value-assessment component 1004 assigns a value associated with the estimated SU utterance "8:00 PM at Boston, Logan" based on training data provided in the data store 128. In one approach, for example, the value-assessment component 1004 begins by determining all other occasions in which the SU component 106 (or a real user) has made the same (or similar) utterance "8:00 PM at Boston, Logan," given the same context-based feature values fed to the action-determining component 1002 (e.g., given the same task, dialog state, etc.). Each of these other occasions occurs within a particular prior dialog (simulated or real). The value-assessment component 1004 next determines, for each such prior dialog, the dialog actions (made by the SU component 106 or the real user) which occurred after the SU utterance ("8:00 PM at Boston, Logan") was made. In some cases, the value-assessment component 1004 will find that the subsequent dialog actions efficiently led to a successful completion of the task under consideration. In other cases, the value-assessment component 1004 will find that the subsequent dialog actions led to a successful completion, but in an inefficient manner. In still other cases, the value-assessment component 1004 will find that the subsequent dialog actions ended in an aborted dialog, and so on. From a high-level perspective, the value-assessment component 1004 determines the value of the estimated SU utterance ("8:00 PM at Boston, Logan") by forming a statistical summary (such as an average) of the outcomes achieved in all such prior occasions in which the SU component 106 (or a real user) has made the same (or similar) utterance in similar dialog conditions to that currently being considered by the action-determining component 1002.

More specifically, the value-assessment component 1004 judges the relative "goodness" or "badness" of a prior dialog based on the two dimensions that are captured by the above-described objective function: UserSimilarity and TaskEfficiency. With respect to the UserSimilarity measure, for each prior dialog under consideration, the value-assessment component 1004 determines the extent to which the sequence of subsequent dialog actions (following the utterance "8:00 PM at Boston, Logan" in the prior dialog) resembles the dialogs that a real user would make, with respect to a particular type of real user identified in the input parameter information fed to the action-determining component 1002. With respect to the TaskEfficiency measure, for each dialog under consideration, the value-assessment component 1004 determines the degree to which the subsequent dialog actions in the prior dialog have efficiently led to a successful outcome.

The value-assessment component 1004 can determine the UserSimilarity measure by comparing one or more target similarity metrics with the characteristics of the ensuing dialog actions in the prior dialog which followed the utterance "8:00 PM at Boston, Logan." For example, assume that one target similarity metric indicates that it is preferable that a dialog terminate in three to six turns. The value-assessment component 1004 can assign a bonus to any prior dialog that meets that criterion, and a penalty to any prior dialog that does not (assuming again that the dialog includes the SU utterance under consideration). In another example, a target similarity metric may indicate that a dialog preferably includes at least one occasion in which the SU component 106 or a real user changes intent during a dialog, e.g., by canceling information that it has already provided to the PDA component 104. The value-assessment component 1004 can assign a reward to any prior dialog that exhibits this type of occurrence, and so on.

The value-assessment component 1004 can determine the TaskEfficiency measure by assigning a predetermined local reward to each subsequent dialog action following the utterance, "8:00 PM at Boston, Logan." The value-assessment component 1004 can then add up the local rewards to provide an overall measure of the efficiency of the prior dialog, following the utterance "8:00 PM at Boston, Logan." For example, the value-assessment component 1004 can assign a value of −1.0 to each subsequent dialog action and a value of 10.0 to an eventual successful completion of the prior dialog, etc. Or the value-assessment component 1004 can assign some positive local reward to each dialog action, but discount each such award based on the "distance" at which it occurs from the seed utterance, "8:00 PM at Boston, Logan"; this will implicitly reward dialogs that terminate in an efficient number of turns.

In summary, in one non-limiting implementation, the value-assessment component 1004 can determine the expected value $Q^\pi(a, s)$ of a particular action a (here, the utterance "8:00 PM at Boston, Logan") in a particular prior dialog, given a particular state s at time t, and given a current input-to-action-mapping policy π, using the following equation:

$$Q^\pi(a, s) = E\{R_t \mid s_t = s\} = E\left\{\left(\sum_{z=0}^{\infty} \gamma^z r_{t+z+1}\right) + UserSimilarity_A\right\}. \quad (5)$$

In this equation, $r_t$ corresponds to a local reward value associated with the seed SU utterance, here "8:00 PM at Boston, Logan." $R_t$ corresponds to a total reward value that will ensue upon following the current input-to-action mapping policy π, to the completion of the prior dialog under consideration. γ refers to a discount factor that grows with increasing z. $UserSimilarity_A$ refers to an extent to which a series of dialog actions (A) starting with (and including) the utterance "8:00 PM at Boston, Logan" conforms to one or more target metrics of user similarity (which encompasses the concept of user diversity). In this equation, the value of an action a given a state s is assessed based on the entire course of a prior dialog under consideration, starting with the action a. But in other implementations, the value-assessment component 1004 can use a temporal difference (TD) approach to assess the value of an action based on its immediately subsequent action.

Note that Equation (5) captures the behavior of a user (or simulated user) in a single prior dialog with respect to the series of actions that start with and include the utterance "8:00 PM at Boston, Logan," and which terminate with the completion of the task or some other dialog terminus. In other implementations, the value-assessment component 1004 can alternatively capture user behavior with respect to other levels of granularity and with respect to other rules. For example, the value-assessment component 1004 can generate a reward for each turn in a dialog, where that reward has two separate components, one attributed to TaskEfficiency and the other attributed to UserSimilarity. In other words, Equation (5) can be modified such that the reward value r within the summation term takes into account both TaskEfficiency and UserSimilarity. In another implementation, the value-assessment component 1004 can apply a UserSimilarity reward value on a periodic basis or event-driven basis—not necessarily at the end of every turn, and not necessarily at the end of the dialog as a whole. In another implementation, the value-assessment component 1004 can capture user behavior as expressed over plural prior dialogs, e.g., N such dialogs. In each such case, the value-assessment component 1004 compares the captured dialog behavior with some metric of a target user behavior that is being modeled.

Alternatively, or in addition, instead of a "flat" reinforcement learning technique (as expressed in Equation (5)), the SU learning component 116 can apply a hierarchical reinforcement learning strategy. In a hierarchical approach, the SU learning component 116 decomposes an overall training task into two or more hierarchical levels of subtasks, and then performs learning with respect to those subtasks in piecemeal fashion. Different subtasks can depend on the UserSimilarity and TaskEfficiency measures in different respective ways. For example, one subtask can attempt to optimize the UserSimilarity measure, while another can attempt to optimize the TaskEfficiency measure, etc.

Returning to the concrete example of Equation (5), that equation assigns a value to just one particular occasion in which the utterance "8:00 PM at Boston, Logan" occurs. The value-assessment component 1004 can use different approaches to determining the overall value of the estimated utterance "8:00 PM at Boston, Logan." In one case, the value-assessment component 1004 forms an average of all individual values (corresponding to respective prior dialogs) that have been computed using the above-specified equation.

In another implementation, the value-assessment component 1004 can employ a machine-trained statistical model (such as a deep-learning neural network) to compute the overall value of each generated SU utterance. That machine-trained statistical model can be trained based on corpus of utterances and associated values (wherein the values can be computed using the above-specified equation). Once properly trained, the value-assessment component 1004 can use the machine-trained statistical model to generate an overall value for "8:00 PM at Boston, Logan" without making any of the individual calculations described above. In one implementation, the machine-trained statistical model (if used) can be trained in an off-line process, and thereafter updated on a periodic or continual basis as new training data is received.

The value-assessment component 1004 outputs value information that reflects the value that is computed for the estimated SU utterance under consideration ("8:00 PM at Boston, Logan"). The SU value-assessment component 1004 can also provide an indication of the relative merit of the estimated SU utterance under consideration ("8:00 PM at Boston, Logan"). In one non-limiting implementation, for instance, the value-assessment component 1004 can identify other SU utterances in the training data (in the data store 128) with respect to the current context being considered (e.g., with respect to the same input parameter information fed to the action-determining component 1002). These other SU utterances constitute a representative sampling of other actions that the action-determining component 1002 could have potentially generated, given the current context. The value-assessment component 1002 can then compare the value of the utterance "8:00 PM at Boston, Logan" with the value of each other alternative SU utterance to provide an indication of the relative merit of the SU utterance "8:00 PM at Boston, Logan." Alternatively, or in addition, the value-assessment component 1004 can form a context-independent distribution of values for different SU utterances encountered thus far, and then compare the value of "8:00 PM at Boston, Logan" against this typical distribution to determine whether the SU utterance can be considered relatively good or bad.

Finally, note that the value-assessment component 1004 is described above as providing its analysis in an online manner, that is, in the course of the processing of a particular training example. But in other implementations, the value-assessment component 1004 can compute the values of different potential estimated SU utterances in an offline manner, and then store these values in a lookup table, cache, or the like. During the real-time phase of the training operation, the SU learning component 116 can consult the lookup table to find the value of a particular estimated SU utterance, if it appears in that table. If the table does not provide a value of the particular estimated SU utterance, the value-assessment component 1004 can compute it in the manner described above and store it in the table for future use. The training system 108 can also periodically repeat the offline value-calculating operation to account for the introduction of new training data.

The updating component 1006 updates the action-determining component based on the value information received from the value-assessment component 1004. For example, the updating component 1006 can update the weighting values used by the SU-analysis component 1008 to either promote or demote the particular estimated SU utterance, depending on whether it is judged good or bad. For instance, the updating component 1006 can use a backpropagation technique to update the weighting values, e.g., using a gradient descent technique or some other approach.

The above-described training procedure is repeated for a large number of candidate training examples, each corresponding to a particular instance of input parameter information. Eventually the training process achieves a state in which the SU-analysis component 1008 reflects a satisfactory input-to-action mapping policy 7E, based on some developer-specified criterion of acceptability. That satisfactory policy will implicitly serve the dual objectives of mimicking the behavior of real users and promoting efficiency in task completion.

Note that the above-described objective function will inherently tend towards an adequate exploration of a range of dialog choices because it is based on conflicting measures, e.g., UserSimilarity and TaskEfficiency. The objective function can further promote exploration of its solution space by including various dialog randomization provisions. For example, the objective function can include a term that, on some turns, randomly increases the weighting value of an otherwise non-optimal SU utterance, to thereby favor its selection as the best SU utterance. Such a provision can cause the SU learning component 116 to explore a new path in its solution space, rather than narrowly refining whatever path it happens to be exploiting at a current time.

In summary, FIG. 10 is annotated with numbered arrows to illustrate one flow of operations. In operation (1), the action-determining component 1002 receives an instance of input parameter information from the data store 128 and/or from any other source. In operation (2), the action-determining component 1002 uses the SU-analysis component 1008 to generate an estimated SU utterance, and sends that utterance to the value-assessment component 1004. In operation (3), the value-assessment component 1004 generates value information associated with the estimated SU utterance, either by looking that information up in a lookup table or generating it in online fashion. In operation (4), the updating component 1006 uses the value information to update the weighting values of the SU-analysis component 1008. The SU learning component 116 repeats operations (1) through (4) for a plurality of training examples to generate an SU-analysis component 1008 having satisfactory performance. In operation (5), the model transfer component 1010 transfer the trained SU-analysis component 1008 to the SU utterance-generating component 122.

To repeat, the training performed in FIG. 10 has been sometimes explained above in the context of training data generated through interaction between the PDA component 104 and the SU component 106. But in an initial stage, the above-described training can be performed based on training data which reflects the interaction between real users and their respective PDA components.

In addition, or alternatively, in an optional initial bootstrapping phase, a developer can use a corpus of training examples to separately train the paraphrasing functionality employed by the SU-analysis component 1008. As previously described, that paraphrasing functionality may correspond to an internal part of a neural network or a separate "downstream" neural network, etc. Each training example includes an initial utterance and a paraphrased version of the utterance. By virtue of this initial (and optional) training procedure, the SU-analysis component 1008 can produce higher quality SU utterances in the early stages of the training operation. As an additional consequence, the SU-analysis component 1008 can, as a whole, more quickly converge to a state of operation that is deemed acceptable. If the initial bootstrapping operation is omitted, the SU learning component 116 will train the paraphrasing functionality as an integral aspect of its training of the overall SU-analysis component 1008, that is, without separately training its paraphrasing functionality. After the initial bootstrapping operation (if applied), the SU learning component 116 will continue to refine the paraphrasing function as an integral aspect of its training of the overall SU analysis component 1008.

A developer can obtain the corpus of training examples for use in the bootstrapping operation from various sources. In one case, a developer can collect an initial set of SU utterances produced by the action-determining component 1002 in the early stages of the training operation, which can be expected to be of poor quality. The developer can then rely on a human annotator to produce a paraphrased version of each original SU utterance. Alternatively, or in addition, the developer can use a machine-trained paraphrasing model to produce each paraphrased version. Alternatively, or in addition, the developer can collect the training examples from any other application(s) and/or system(s), not necessarily limited to a personal digital assistant system. From whatever source(s) they are obtained, the developer can store the training examples in the data store 128.

To summarize the above explanation, the SU learning component 116 can operate in various training modes. In one mode, the SU learning component 116 starts completely "cold" with no prior dialog data and without the above-described initial paraphrase-based training operation. In another mode, the SU learning component 116 relies on either a corpus of prior dialog data or the paraphrase-based training operation, but not both. In another mode, the SU learning component 116 relies on both prior dialog data and the paraphrase-based training operation. In this sense, the training system 102 can be said to operate in a fully automated self-learning mode (without supervision) or a partially-automated self-learning mode (with minimal supervision).

Further note that FIG. 10 has been explained above in the context of the development of a single SU-analysis component 1008. That single model 1008 can generate estimated SU utterances for different user types. To perform this task, the single model 1008 can be trained using input parameter information that includes a user type ID and/or other user-specific metrics, which describe a particular type of user. The training process then implicitly takes the user type information into account when it generates estimated SU utterances, as one variable among others.

In another implementation, the architecture of FIG. 10 can be used to train separate SU-analysis components for different respective user types. In doing so, each SU-analysis component can be trained based on only dialogs (real and/or simulated) that pertain to that user type. In the runtime phase, the configuration component 206 (of FIG. 2) can load an appropriate SU-analysis component into the action-determining component 202, depending on which user type has been selected by the scenario-selecting component 118.

Now referring to the PDA component 104, the PDA learning component 114 can use any technique to update the PDA-analysis component(s) 110, including a technique that is complementary to that described above with respect to FIG. 10. But in the case of the PDA learning component 114, in one implementation, the reinforcement learning technique attempts to satisfy an objective function having only one component: TaskEfficiency. In particular, the PDA learning component 114 can attempt to achieve an objective that maximizes the number of completed tasks and which does so in an efficient manner (e.g., using an efficient number of steps). That objective function can weight these two dimensions of efficiency using different weighting parameters. The weighting parameters determine the relative importance of each dimension relative to the other.

More specifically, consider the implementation of the combined PDA component 902 shown in FIG. 9. The PDA learning component 114 can use the same technique described in FIG. 10 to update the combined analysis component 904, again, with the exception that the reinforcement learning technique attempts to maximize an objective defined by the TaskEfficiency measure, not the UserSimilarity measure, e.g., by omitting the UserSimilarity term in Equations (4) and (5).

Next consider the implementation of FIG. 6. The PDA learning component 114 can use the same technique described in FIG. 10 to update the PDA-analysis component used by the dialog management component 606, again with the exception that the reinforcement learning technique attempts to maximize an objective defined by the TaskEfficiency measure, not the UserSimilarity measure.

The PDA learning component 114 can also apply the training data in the data store 128 to update any other PDA-analysis components used by the PDA component 104 of FIG. 6, such as a domain model, an intent model, a slot analysis model, etc. The PDA learning component 114 can use any environment specific technique to perform this training (not necessarily a reinforcement learning technique), such as by using a supervised learning technique.

For example, consider the case of a machine-trained domain model used by the LU component 604. The training data in the data store 128 includes a large number of SU utterances, together with a context-based feature value that indicates the domain associated each SU utterance. More specifically, the scenario-selecting component 118 defines the task of each dialog (as a given), and the domain of each SU utterance can be considered to correspond to the domain of the overall task; in this manner, the scenario-selecting component 118 automatically specifies the domain of each SU utterance. The PDA learning component 114 can use any supervised learning technique to update the domain model used by the LU component 604 based on this automatically labeled training data. The training system 108 as a whole facilitates even these kinds of supervised learning techniques because it automatically generates a large amount of high-quality training data, without requiring human experts to manually collect and label the training data, and without requiring the participation of actual users who interact with the PDA component 104.

Figure 11:
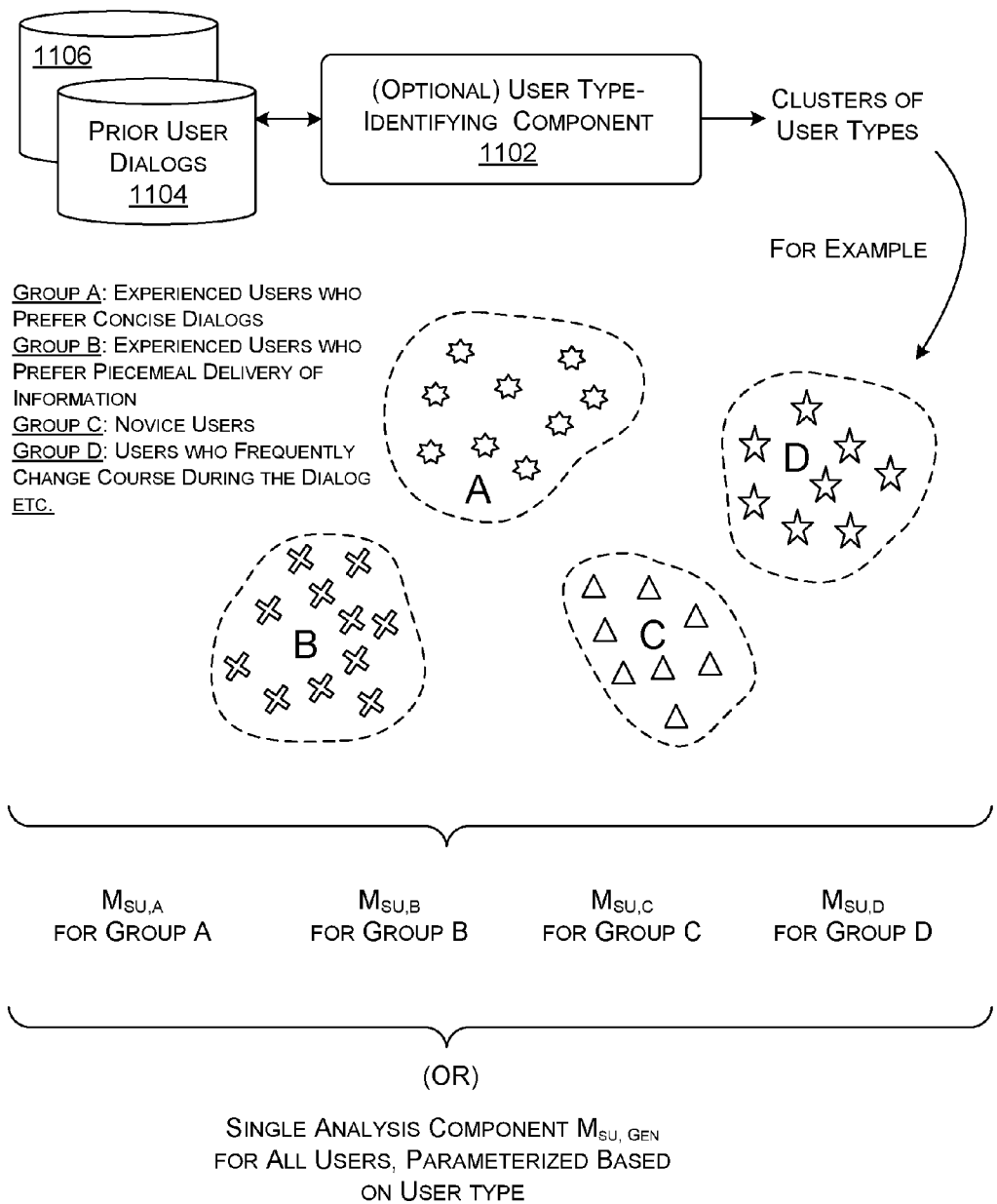
FIG. 11 shows one implementation of a user type-identifying component.

Advancing now to FIG. 11, this figure shows one implementation of a user type-identifying component 1102. The user type-identifying component 1102 receives prior dialog data (provided in a data store 1104) that describes a collection of dialogs that have taken place between real users and the PDA component 104. The user type-identifying component 1102 can also optionally receive user data from other sources, such as profile data maintained by the users (provided in a data store 1106). In response, the user type-identifying component 1102 identifies clusters in the data corresponding to different user types (examples of which were cited above).

The user type-identifying component 1102 can perform the clustering operation using different approaches. For example, the user type-identifying component 1102 can receive a developer's manual selection of at least one particular dimension of user data to be considered, such as user experience, or user consistency, or user intelligibility, etc. The user type-identifying component 1102 can then use any known clustering algorithm (such as the k-means clustering algorithm) to cluster the user data with respect to the chosen dimension(s). Or the user type-identifying component 1102 can use any type of multivariate clustering technique to define user types along plural dimensions of the user data, e.g., by leveraging a cosine similarity measure, etc.

The user type-identifying component 1102 can provide a label to each identified user type. The user type-identifying component 1102 can also provide parameter values that describe each user type. For example, the user type-identifying component 1102 can identify the average number of turns that a particular group of users takes to complete their tasks. With respect to a non-native speaking user, the user type-identifying component 1102 can provide statistical information regarding those users' speech patterns, and so on.

The scenario-selecting component 118 can leverage the output of the user type-identifying component 1102 by establishing a category (in the data store 120) for each identified cluster. Further, as explained above, the SU learning component 116 can provide different SU-analysis components for different respective user types. For example, the SU learning component 116 can provide an SU-analysis component that approximates the behavior of expert users, and an SU-analysis component that approximates the behavior of novice users.

B. Illustrative Processes

FIGS. 12-16 show processes that explain the operation of the environment 102 of Section A in flowchart form. Since the principles underlying the operation of the environment 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

Figure 12:
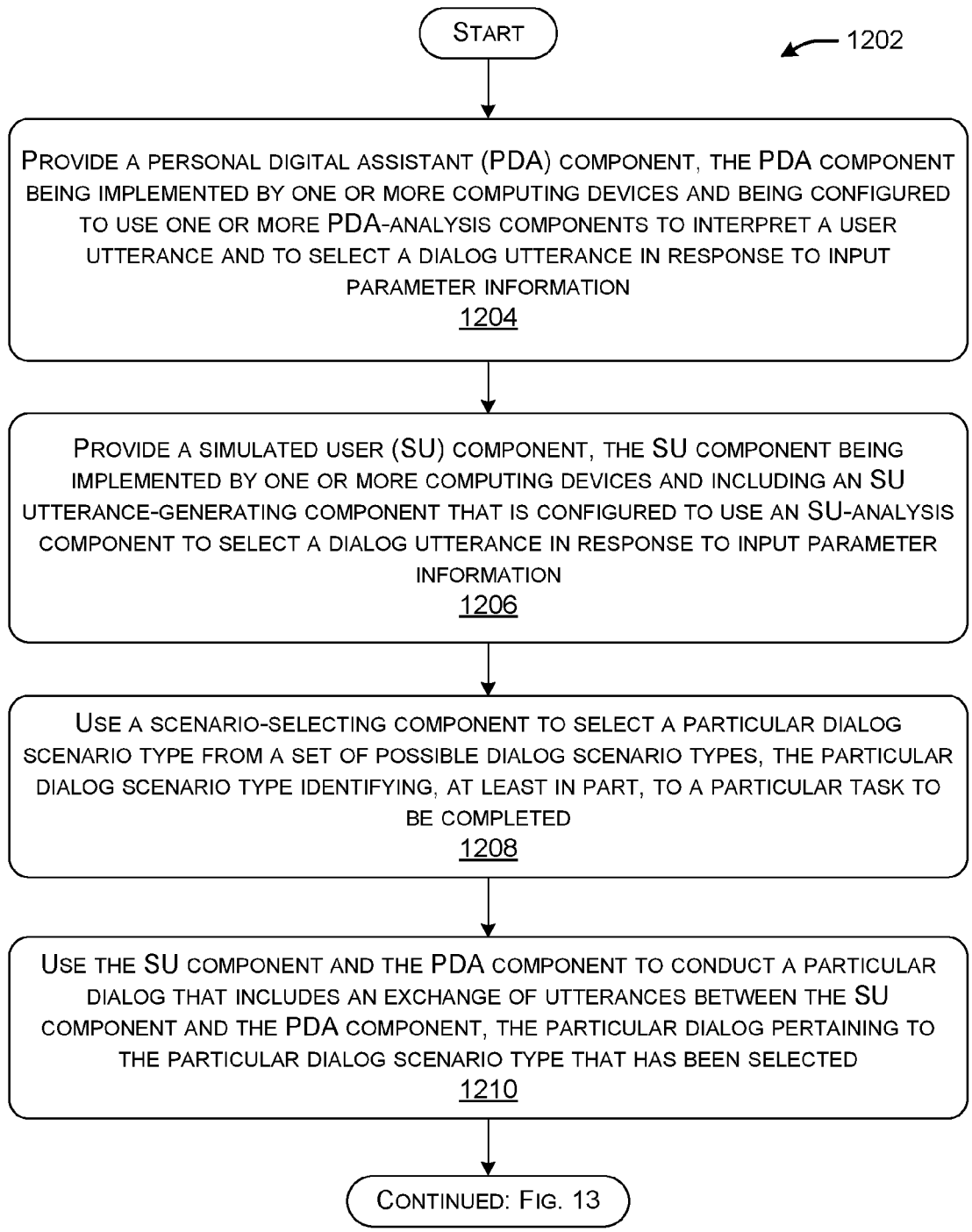
FIGS. 12 and 13 collectively show a flowchart which describes an overview of the operation of the environment of FIG. 1.

FIG. 12 shows a process 1202, implemented by one or more computing devices, for training the personal digital assistant (PDA) component 104 and the simulated user (SU) component 106 via a self-learning strategy. Block 1204 entails providing the PDA component 104. The PDA component 104 is implemented by one or more computing devices. The PDA component 104 uses one or more PDA-analysis components 110 to at least interpret a user utterance and to select a dialog utterance in response to input parameter information. Block 1206 entails providing the simulated user (SU) component 106. The SU component 106 is implemented by one or more computing devices. The SU component 106 further includes the SU utterance-generating component 122 which is configured to use an SU-analysis component to select a dialog utterance in response to input parameter information. Block 1208 entails using the scenario-selecting component 118 to select a particular dialog scenario type from a set of possible dialog scenario types, the particular dialog scenario type identifying, at least in part, a particular task to be completed. Block 1210 entails using the SU component 106 and the PDA component 104 to conduct a particular dialog that includes an exchange of utterances between the SU component 106 and the PDA component 104, the particular dialog pertaining to the particular dialog scenario type that has been selected.

The following dialog is an example of the outcome of block 1210:

SU component: Book a table.
PDA component: Great, where do you want to book a table?
SU component: Palomino in Bellevue.
PDA component: At what time?
SU component: Tomorrow 7 pm.
PDA component: What name should I use for the booking?
SU component: John.
PDA component: What phone number can I use?
SU component: 999-999-9999.

PDA component: Booking complete, texting you the link for the reservation.

More specifically, the above-specified dialog reflects the operation of a somewhat ideal user type. Other user types can be expected to make dialog actions that are somewhat anomalous. For example, when asked by the PDA component 104, "What name should I use for the booking," another user type, representing a person that is readily confused, might answer, "Palomino," etc. Another user type might correctly provide the answer, "John," but then might also volunteer their phone number, although not asked yet for this information. Another user type might provide new values for previously-specified pieces of information, such as by stating, "Sorry, change it to Jane, not John," instead of answering the immediate question posed by the PDA component 104.

Figure 13:
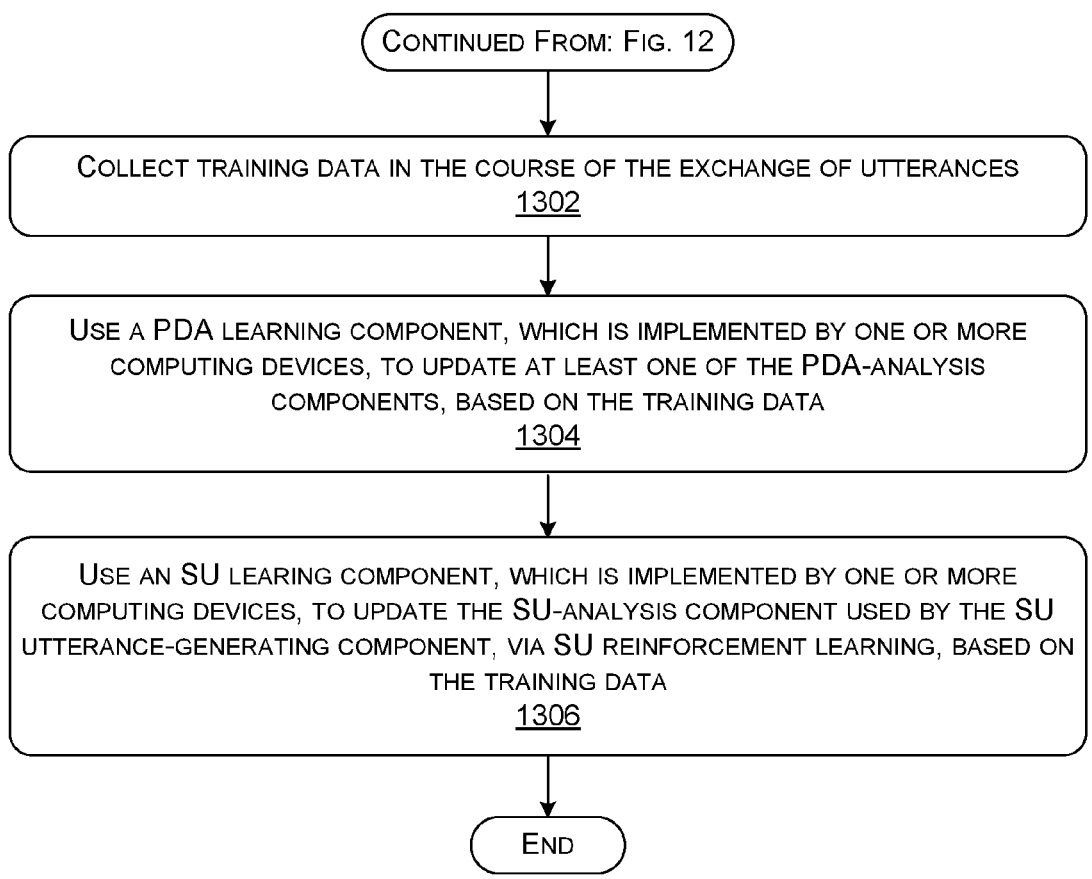

Advancing to FIG. 13 (which is a continuation of FIG. 12), block 1302 involves collecting training data in course of the exchange of utterances (in block 1210). Block 1304 entails using the PDA learning component 114, which is implemented by one or more computing devices, to update at least one of the above-referenced one or more PDA-analysis components used by the PDA component 104, and based on the training data. And block 1306 entails using the SU learning component 116, which is implemented by one or more computing devices, to update the SU-analysis component used by the SU utterance-generating component 122, via SU reinforcement learning, and based on the training data. As noted in Subsection A.4, the training system 108 can operate in a fully automated mode or a partially automated mode (e.g., by relying on the use of human-created and/or model-created paraphrase data in a bootstrapping phase of training).

Figure 14:
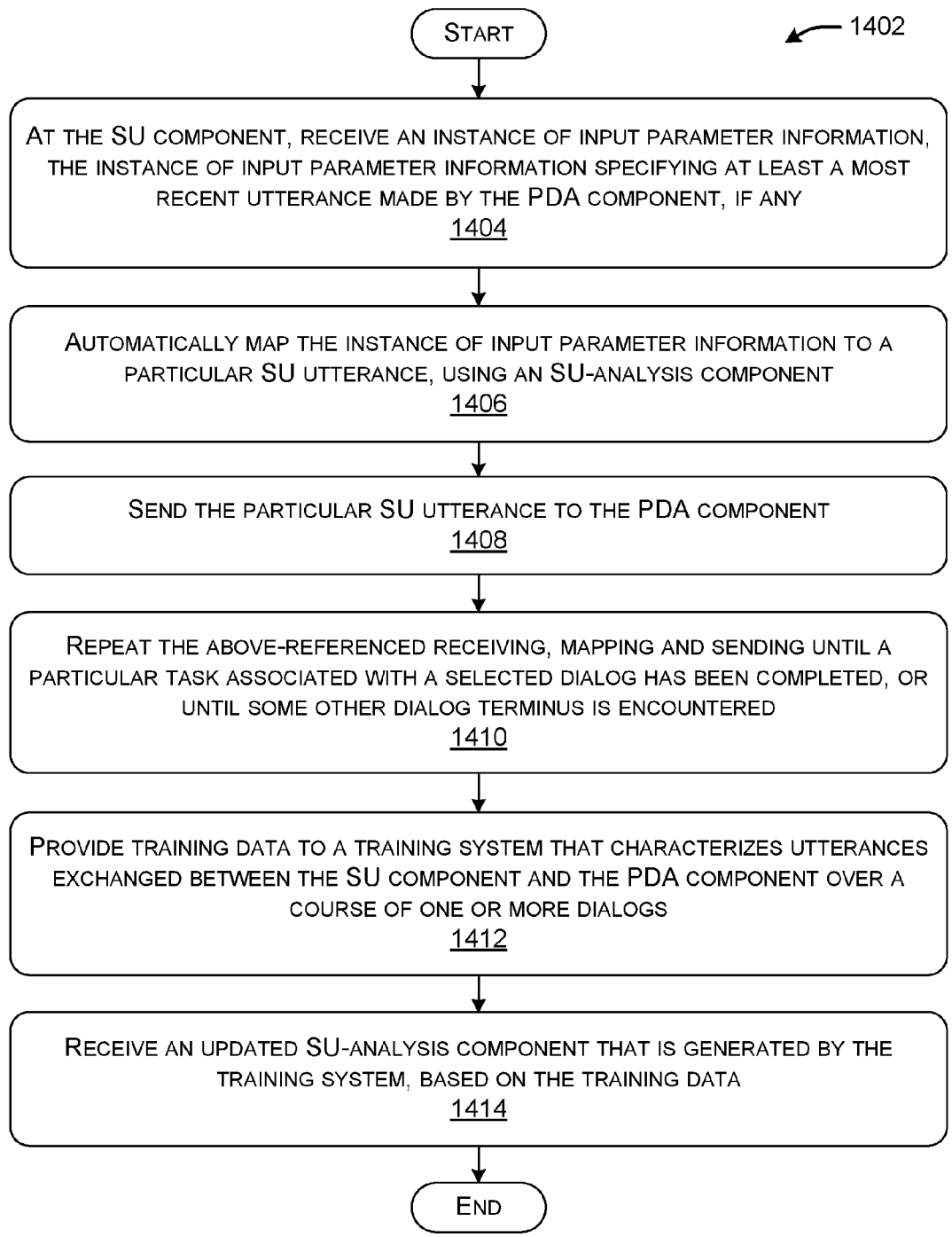
FIG. 14 is a flowchart that describes one manner of operation of the SU component of FIG. 1.

FIG. 14 is a process 1402 that explains the operation of the SU component 106 in greater detail compared to FIG. 12-13. In block 1404, the SU component 106 receives an instance of input parameter information, the instance of input parameter information specifying at least a most recent utterance made by the PDA component 104, if any. In block 1406, the SU component 106 automatically maps the instance of input parameter information to a particular SU utterance, using its SU-analysis component. In block 1408, the SU component 106 sends the particular SU utterance to the PDA component 104. In block 1410, the SU component 106 repeats the above-described operations of receiving, mapping and sending until a particular task associated with a selected dialog has been completed or some other dialog terminus is encountered. In block 1412, the SU component 106 provides training data to the training system 108 that characterizes utterances exchanged between the SU component 106 and the PDA component 104 over a course of one or more dialogs. In block 1414, the SU component 106 receives an updated SU-analysis component that is generated by the training system 108, based on the training data.

Figure 15:
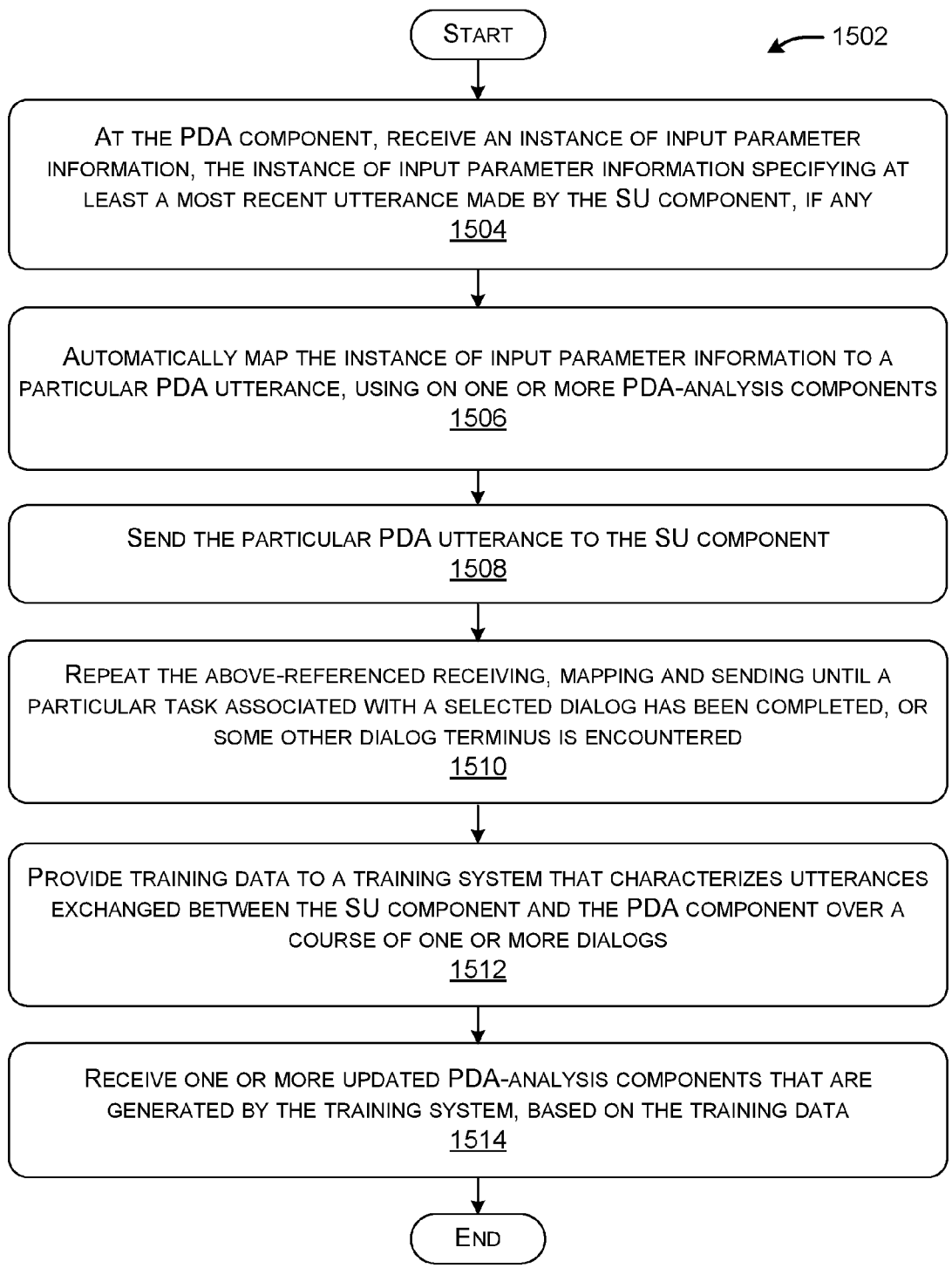
FIG. 15 is a flowchart that describes one manner of operation of the PDA component of FIG. 1.

FIG. 15 is a process 1502 that explains the operation of the PDA component 104 in greater detail compared to FIG. 12-13. This process 1502 is the complement of the process 1402 of FIG. 14. In block 1504, the PDA component 104 receives an instance of input parameter information, the instance of input parameter information specifying at least a most recent utterance made by the SU component 106, if any. In block 1506, the PDA component 104 automatically maps the instance of input parameter information to a particular PDA utterance, using its PDA-analysis component(s). In block 1508, the PDA component 104 sends the particular PDA utterance to the SU component 106. In block 1510, the PDA component 104 repeats the above-described operations of receiving, mapping and sending until a particular task associated with a selected dialog has been completed or some other dialog terminus is encountered. In block 1512, the PDA component 104 provides training data to the training system 108 that characterizes utterances exchanged between the SU component 106 and the PDA component 104 device over a course of one or more dialogs. In block 1514, the PDA component 104 receives one or more updated PDA-analysis components that are generated by the training system 108, based on the training data.

Figure 16:
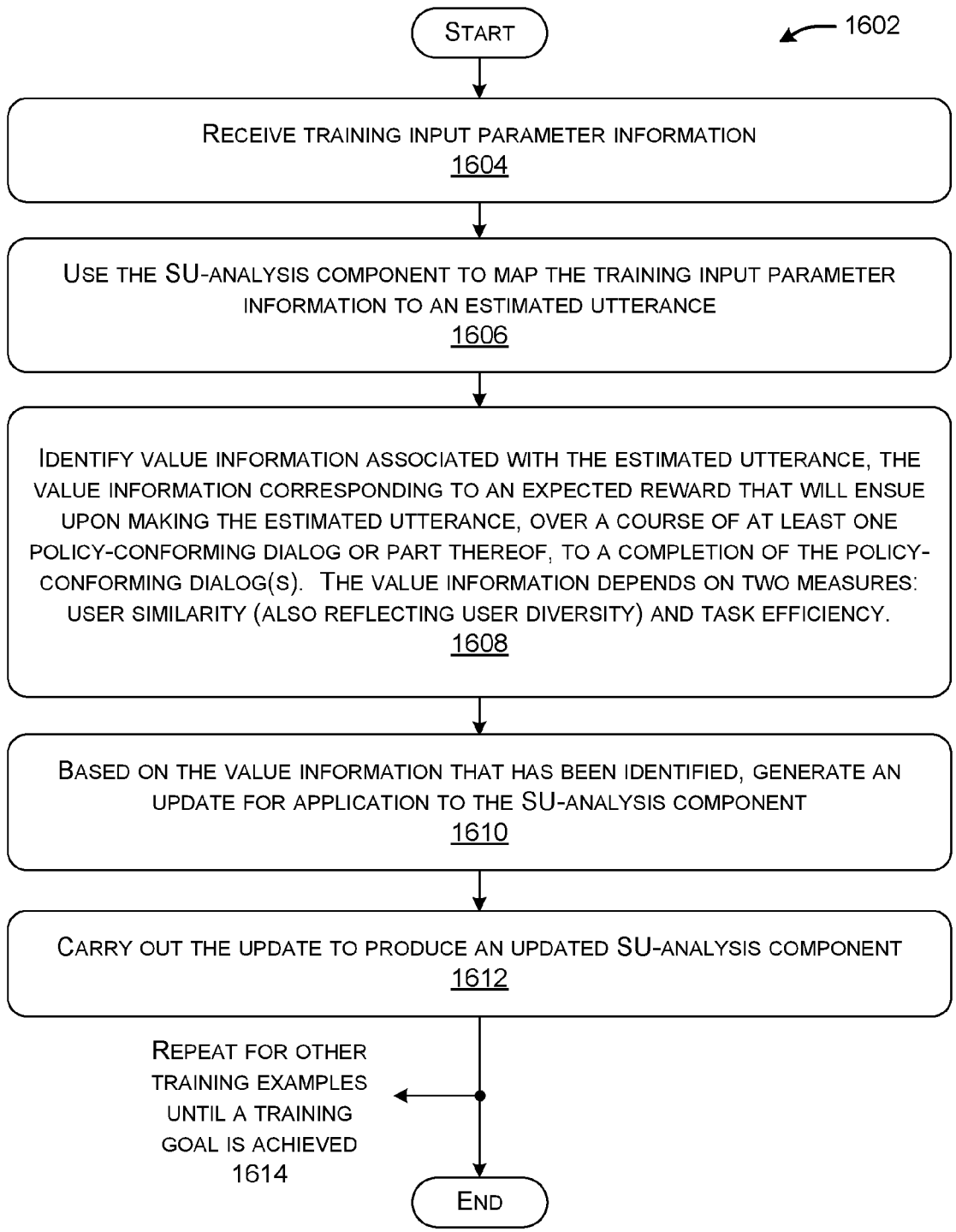
FIG. 16 is a flowchart that describes one manner of operation of the SU learning component of FIG. 10.

FIG. 16 shows a process 1602 whereby SU learning component 116 generates and updates an SU-analysis component with respect to an individual training episode (e.g., with respect to the processing of a single training example). In block 1604, the SU learning component 116 receives training input parameter information. In block 1606, the SU learning component 116 uses its SU-analysis component to map the training input parameter information to an interpreted action (e.g., an estimated SU utterance). In block 1608, the SU learning component 116 identifies value information associated with the interpreted action, the value information corresponding to an expected total reward that will ensue upon taking the interpreted action over a course of at least one policy-conforming dialog or part thereof to a completion of the policy-conforming dialog(s). The value information incorporates the TaskEfficiency and UserSimilarity measures described in Subsection A.4. In block 1610, based on the value information that has been identified, the SU learning component 116 generates an update that will have an effect of advancing the training objective described above. In block 1612, the SU learning component 116 carries out the update to produce an updated SU-analysis component. Block 1614 indicates that the SU learning component 116 repeats the process 1602 for different respective training examples until a training goal is achieved, e.g., until a desired measure of model performance is achieved.

Although not explicitly shown, the PDA learning component 114 can, at least in part, train a PDA-analysis component using the same procedure shown above with respect to FIG. 16. But the PDA learning component 114 will apply a different objective function when performing reinforcement learning, compared to the SU learning component 116, as described in Section A.

C. Representative Computing Functionality

Figure 17:
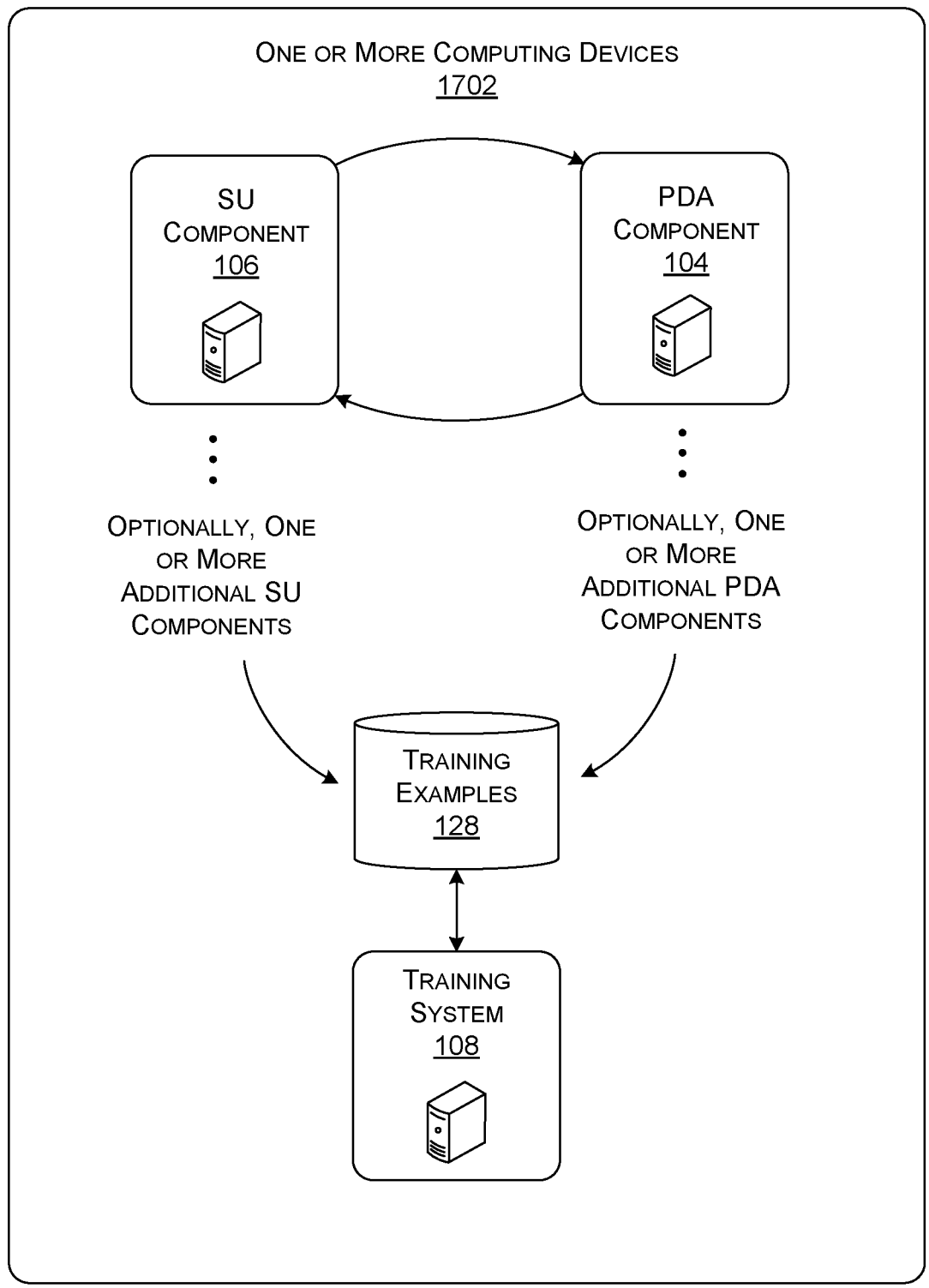
FIG. 17 shows one implementation of the environment of FIG. 1 that uses one or more computing devices.

FIG. 17 shows one implementation of the environment 102 of FIG. 1 that uses one or more computing devices 1702, such as one or more personal computing device and/or one or more server computing devices.

In one implementation, the environment 102 can include a single instance of the SU component 106 and a single instance of the PDA component 104. These two instances interact with each other over the course of plural dialogs and plural tasks to collect training data for storage in the data store 128. The SU component 106 and the PDA component 104 can be implemented by the same computing device or by respective different computing devices.

In another implementation, one, two, or more SU components can interact with one, two, or more PDA components. All pairs of instances can forward their training data to the data store 128. Any instance of the SU component can be implemented using the same or a different computing device compared to its counterpart PDA component.

The training system 108 itself can likewise be implemented by one or more computing devices. In some cases, the computing device(s) that are used to perform the training process are separate from the computing device(s) that are used to implement the SU component(s) and the PDA component(s), although the training system 108 can also perform the training process on the same computing devices as the SU component(s) and the PDA component(s).

Figure 18:
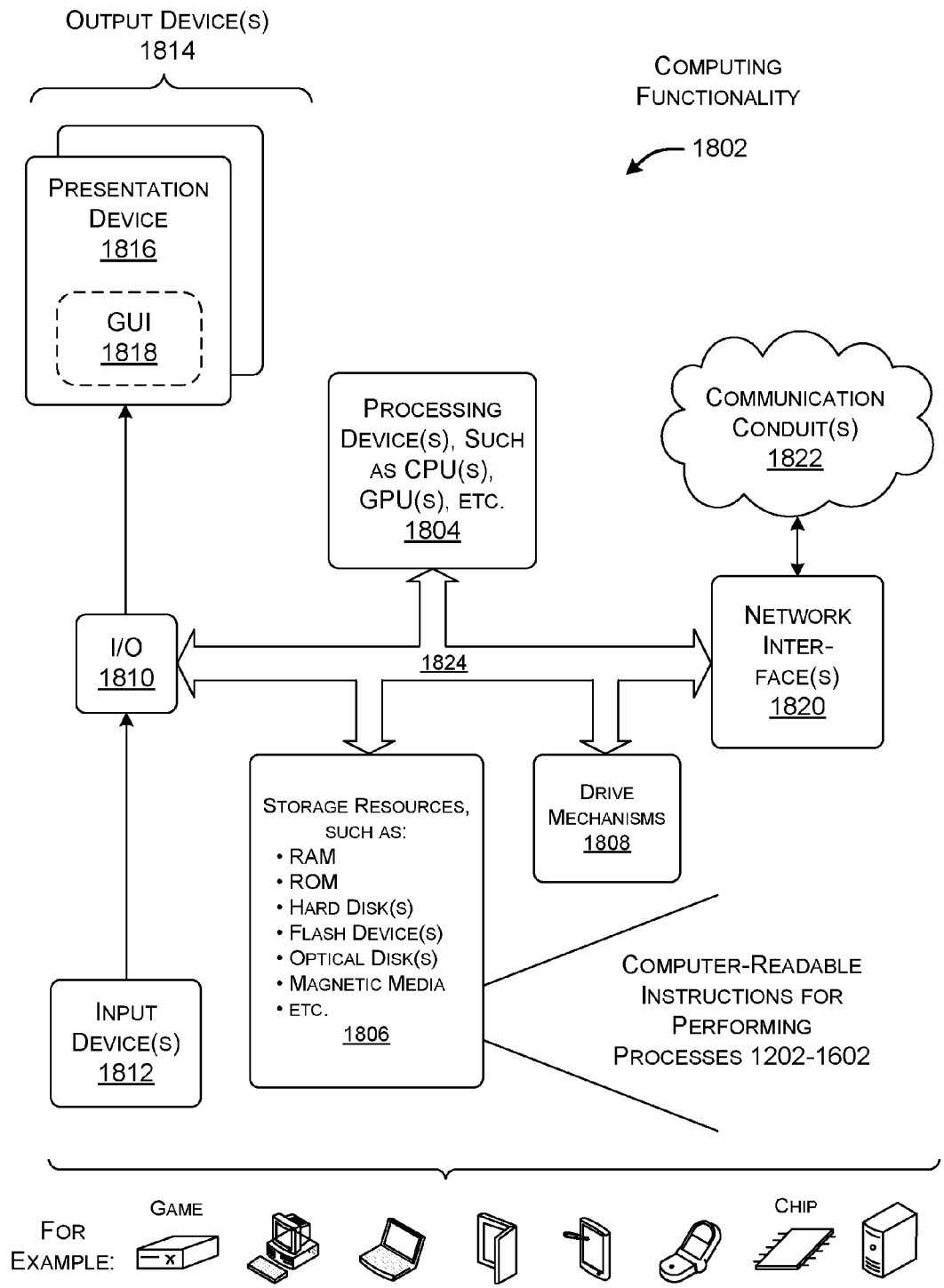
FIG. 18 shows illustrative computing functionality that can be used to implement any aspect of the features shown in the foregoing drawings.

FIG. 18 shows computing functionality 1802 that can be used to implement any aspect of the mechanisms set forth in the above-described figures. For instance, the type of computing functionality 1802 shown in FIG. 18 can be used to implement any of the SU component 106, the PDA component 104, and/or the training system 108. In all cases, the computing functionality 1802 represents one or more physical and tangible processing mechanisms.

The computing functionality 1802 can include one or more hardware processor devices 1804, such as one or more central processing units (CPUs), and/or one or more graphical processing units (GPUs), and so on. The computing functionality 1802 can also include any storage resources (also referred to as computer-readable storage media or computer-readable storage medium devices) 1806 for storing any kind of information, such as machine-readable instructions, settings, data, etc. Without limitation, for instance, the storage resources 1806 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1802. The computing functionality 1802 may perform any of the functions described above when the hardware processor device(s) 1804 carry out computer-readable instructions stored in any storage resource or combination of storage resources. For instance, the computing functionality 1802 can carry out the processes (1202-1602) of FIGS. 12-16 in this manner. The computing functionality 1802 also includes one or more drive mechanisms 1808 for interacting with any storage resource, such as a hard disk drive mechanism, an optical disk drive mechanism, and so on.

The computing functionality 1802 also includes an input/output component 1810 for receiving various inputs (via input devices 1812), and for providing various outputs (via output devices 1814). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1816 and an associated graphical user interface presentation (GUI) 1818. The display device 1816 may correspond to a charge-coupled display device, a cathode ray tube device, a projection mechanism, etc. Other output devices include a printer, a generating mechanism, a haptic output mechanism, an archival mechanism (for storing output information), and so on. The computing functionality 1802 can also include one or more network interfaces 1820 for exchanging data with other devices via one or more communication conduits 1822. One or more communication buses 1824 communicatively couple the above-described components together.

The communication conduit(s) 1822 can be implemented in any manner, e.g., by a local area computer network, a wide area computer network (e.g., the Internet), point-to-point connections, etc., or any combination thereof. The communication conduit(s) 1822 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1802 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a system is described, including one or more computing devices, for use in training analysis components via a self-learning strategy. The system includes a personal digital assistant (PDA) component and a simulated user (SU) component. The PDA component is implemented by one or more computing devices, and is configured to use one or more PDA-analysis components to at least interpret a user utterance and to select a dialog utterance in response to input parameter information. The SU component is implemented by one or more computing devices and includes an SU utterance-generating component that is configured to use an SU-analysis component to select a dialog utterance in response to input parameter information. The system also includes a scenario-selecting component, implemented by one or more computing devices, that is configured to select a particular dialog scenario type from a set of possible dialog scenario types. The particular dialog scenario type pertains, at least in part, to a particular task to be completed. The SU component and the PDA component are further configured to conduct a particular dialog that includes an exchange of utterances between the SU component and the PDA component, the particular dialog pertaining to the particular dialog scenario type that has been selected. The system further includes a training system that is implemented by one or more computing devices. The training system uses a self-learning strategy to train the PDA component and the SU component. The training system includes: a collection component configured to collect training data in course of the exchange of utterances; a PDA learning component configured to update the PDA-analysis component(s) used by the PDA component, based on the training data; and an SU learning component configured to update the SU-analysis component used by the SU utterance-generating component, via reinforcement learning, based on the training data.

According to a second aspect, the particular dialog scenario type specifies a particular type of user from among a set of possible types of users, wherein each user type pertains to users who exhibit a particular type of behavior when interacting with the PDA component.

According to a third aspect, the SU reinforcement learning aims to achieve an objective that promotes at least: (a) efficient completion of tasks; and (b) dialog behavior that resembles actual user behavior exhibited by two or more user types.

According to a fourth aspect, the PDA learning component is configured to perform learning that aims to achieve an objective that promotes at least efficient completion of tasks.

According to a fifth aspect, the SU utterance-generating component uses a neural network that is configured based on weighting values specified by the SU-analysis component. The neural network is configured to map an input PDA utterance to an output SU utterance.

According to a sixth aspect, a method is described, implemented by one or more computing devices, for training analysis components via a self-learning strategy. The method includes providing a personal digital assistant (PDA) component and a simulated user (SU) component. The PDA component is implemented by one or more computing devices and is configured to use one or more PDA-analysis components to at least interpret a user utterance and to select a dialog utterance in response to input parameter information. The SU component is implemented by one or more computing devices and includes an SU utterance-generating component that is configured to use an SU-analysis component to select a dialog utterance in response to input parameter information. The method further includes using a scenario-selecting component to select a particular dialog scenario type from a set of possible dialog scenario types, the particular dialog scenario type identifying, at least in part, a particular task to be completed. The method further includes using the SU component and the PDA component to conduct a particular dialog that includes an exchange of utterances between the SU component and the PDA component, the particular dialog pertaining to the particular dialog scenario type that has been selected. The method also includes: collecting training data in course of the exchange of utterances; using a PDA learning component, that is implemented by one or more computing devices, to apply a self-learning strategy to update the PDA-analysis component(s) used by the PDA component, based on the training data; and using an SU learning component, that is implemented by one or more computing devices, to apply a self-learning strategy to update the SU-analysis component used by the SU utterance-generating component, via SU reinforcement learning, based on the training data.

According to a seventh aspect, the particular dialog scenario type specifies a particular type of user from among a set of possible user types, wherein each user type pertains to users who exhibit a particular type of behavior when interacting with the PDA component.

According to an eighth aspect, the above-referenced different user types exhibit different levels of experience in interacting with the PDA component. In another case, the above-referenced different user types exhibit different preferences among users as to conciseness of dialog sessions.

According to a ninth aspect, the particular dialog scenario type also specifies one or more of: a time value corresponding to a time at which the particular dialog is assumed to be conducted; and/or a location value corresponding to a location at which the particular dialog is assumed to be conducted.

According to an tenth aspect, the SU utterance-generating component is configured to choose a particular kind of SU-analysis component that is suited to the particular type of user that has been specified.

According to a eleventh aspect, the SU utterance-generating component is configured to receive input parameter information which specifies the particular type of user. The SU-analysis component is a general-purpose SU-analysis component that is configured to generate SU utterances associated with two or more types of users, and the SU utterance-generating component is configured to use the general-purpose SU-analysis component to generate SU utterances in a manner that is appropriate for the particular type of user.

According to a twelfth aspect, the conducting of the particular dialog includes, at the SU component: receiving a first instance of input parameter information, the first instance of input parameter information specifying at least a most recent utterance made by the PDA component, if any; using the SU-generating component to map the first instance of input parameter information to a particular SU utterance; and sending the particular SU utterance to the PDA component. The conducting of the particular dialog also includes, at the PDA component: receiving a second instance of input parameter information, the second instance of input parameter information specifying at least the particular SU utterance generated by the SU component; using the PDA component to map the second instance of input parameter information to a particular PDA utterance; and sending the particular PDA utterance to the SU component. Overall, the conducting of the particular dialog repeats exchanges of utterances between the PDA component and the SU component until the particular task has been completed or the particular dialog is aborted.

According to a thirteenth aspect, the SU reinforcement learning aims to achieve an objective that promotes at least: (a) efficient completion of tasks; and (b) dialog behavior that resembles actual user behavior exhibited by two or more types of users.

According to a fourteenth aspect, the SU reinforcement learning is configured to approximate different user behavior based on training data that describes the actual user behavior.

According to a fifteenth aspect, the SU reinforcement learning is configured to approximate different user behavior based on one or more specified constraints in an objective function that characterize the different user behavior.

According to a sixteenth aspect, the SU reinforcement learning includes, with respect to a particular individual instance of training: receiving training input parameter information; using the SU-analysis component to map the training input parameter information to an estimated utterance; identifying value information associated with the estimated utterance, wherein the value information corresponds to an expected reward that will ensue upon taking the estimated utterance, and the value information incorporates a first measure that reflects an extent to which the estimated utterance is projected to lead to efficient task completion, and a second measure which reflects an extent to which the estimated utterance is projected to lead to dialog behavior that resembles target user behavior being modeled; based on the value information that has been identified, generating an update for application to the SU-analysis component; and carrying out the update to produce an updated SU-analysis component.

According to a seventeenth aspect, the SU-analysis component includes paraphrasing functionality. The SU learning component trains the paraphrasing functionality in an initial bootstrapping phase based on a corpus of training examples obtained from one or more sources.

According to an eighteenth aspect, the SU utterance-generating component uses a deep neural network that is configured based on weighting values specified by the SU-analysis component. The deep neural network is configured to map an input PDA utterance into an output SU utterance, and wherein the deep neural network includes feedforward neural network functionality, or convolutional neural network functionality, or recursive neural network functionality, or gating neural network functionality, and/or any combination thereof.

According to a nineteenth aspect, the PDA reinforcement learning aims to achieve an objective that promotes at least efficient completion of tasks.

According to a twentieth aspect, a computer-readable storage medium is described for storing computer-readable instructions, the computer-readable instructions, when executed by one or more processor devices, performing a method by a simulated user (SU) component. The method includes: receiving an instance of input parameter information, the instance of input parameter information specifying at least a most recent utterance made by a personal digital assistant (PDA) component, if any; automatically mapping the instance of input parameter information to a particular SU utterance, based on an SU-analysis component; and sending the particular SU utterance to the PDA component. The method also includes repeating the receiving, mapping and sending operations until a particular task associated with a selected dialog has been completed. The method further includes providing training data to a training system that characterizes utterances exchanged between the SU component and the PDA component over a course of one or more dialogs. The method also includes receiving an updated analysis component that is generated by the training system, based on the training data.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a processing device; and
   a storage resource storing machine-readable instructions which, when executed by the processing device, cause the processing device to:
   provide a personal digital assistant configured to interpret user utterances and to select personal digital assistant dialog utterances in response to first input parameter information;
   provide a simulated user, distinct from the personal digital assistant, that is configured to select simulated user dialog utterances in response to second input parameter information;
   select a particular dialog scenario type from a set of possible dialog scenario types, the particular dialog scenario type pertaining, at least in part, to a particular task to be completed,
   the simulated user and the personal digital assistant being configured to conduct a particular dialog that includes an exchange of utterances between the simulated user and the personal digital assistant, the particular dialog pertaining to the particular dialog scenario type that has been selected; and
   train the personal digital assistant and the simulated user based at least on the exchange of utterances between the simulated user and the personal digital assistant.

2. The system of claim 1, wherein the particular dialog scenario type specifies a particular type of user from among a set of possible types of users, wherein each user type pertains to users who exhibit a particular type of behavior when interacting with the personal digital assistant.

3. The system of claim 1, wherein the machine-readable instructions, when executed by the processing device, cause the processing device to:
   perform reinforcement learning of the simulated user based at least on an objective that promotes at least: (a) efficient completion of tasks; and (b) dialog behavior that resembles actual user behavior exhibited by two or more user types.

4. The system of claim 1, wherein the machine-readable instructions, when executed by the processing device, cause the processing device to:
   perform learning of the personal digital assistant based at least on an objective that promotes at least efficient completion of tasks.

5. The system of claim 1, wherein the machine-readable instructions, when executed by the processing device, cause the processing device to:
   train a neural network associated with the simulated user that is configured based at least on weighting values, wherein the neural network is configured to map an input personal digital assistant utterance to an output simulated user utterance.

6. A method implemented by one or more computing devices, the method comprising:
   providing a personal digital assistant, the personal digital assistant being configured to interpret user utterances and to select personal digital assistant utterances in response to first input parameter information;
   providing a simulated user, the simulated user being configured to select simulated user utterances in response to second input parameter information;
   selecting a particular dialog scenario type from a set of possible dialog scenario types, the particular dialog scenario type identifying, at least in part, a particular task to be completed;
   causing the simulated user and the personal digital assistant to conduct a particular dialog that involves an exchange of utterances, the particular dialog pertaining to the particular dialog scenario type that has been selected;
   collecting training data via the exchange of utterances between the personal digital assistant and the simulated user;
   performing self-learning of the personal digital assistant based at least on the training data collected via the exchange of utterances between the personal digital assistant and the simulated user; and performing self-learning of the simulated user based at least on the training data collected via the exchange of utterances between the personal digital assistant and the simulated user.

7. The method of claim 6, wherein the particular dialog scenario type specifies a particular type of user from among a set of possible user types, wherein each user type pertains to users who exhibit a particular type of behavior when interacting with the personal digital assistant.

8. The method of claim 7, wherein different user types exhibit different levels of experience in interacting with the personal digital assistant.

9. The method of claim 7, wherein the particular dialog scenario type also specifies one or more of:
a time value corresponding to a time at which the particular dialog is assumed to be conducted; and/or
a location value corresponding to a location at which the particular dialog is assumed to be conducted.

10. The method of claim 7, further comprising:
training a particular analysis component of the simulated user specifically for the particular type of user that has been specified; and
training another analysis component of the simulated user specifically for another type of user.

11. The method of claim 7, further comprising:
performing general-purpose training of an analysis component of the simulated user to generate different simulated user utterances based at least on two or more types of users,
wherein the simulated user is configured to use the analysis component to generate at least some simulated user utterances in a manner that is appropriate for the particular type of user based at least on a particular parameter specifying the particular type of user.

12. The method of claim 6, further comprising:
conducting the particular dialog with the simulated user by:
receiving a most recent utterance made by the personal digital assistant;
based at least on the second input parameter information, using the simulated user to map the most recent utterance by the personal digital assistant to a particular simulated user utterance; and
sending the particular simulated user utterance to the personal digital assistant, and
conducting the particular dialog with the personal digital assistant by:
receiving the particular simulated user utterance generated by the simulated user;
based at least on the first input parameter information, using the personal digital assistant to map the particular simulated user utterance to a particular personal digital assistant utterance; and
sending the particular personal digital assistant utterance to the simulated user,
wherein said conducting the particular dialog repeats exchanges of utterances between the personal digital assistant and the simulated user until the particular task has been completed or the particular dialog is aborted.

13. The method of claim 6, wherein the self-learning of the simulated user involves reinforcement learning based at least an objective that promotes at least: (a) efficient completion of tasks; and (b) dialog behavior that resembles actual user behavior exhibited by two or more types of users.

14. The method of claim 13, further comprising:
approximating different user behavior based at least on characteristics of the training data that describe actual user behavior.

15. The method of claim 13, further comprising:
approximating different user behavior based at least on one or more specified constraints in an objective function that characterize the different user behavior.

16. The method of claim 13, further comprising, with respect to a particular individual instance of training:
receiving training input parameter information;
mapping the training input parameter information to an estimated utterance by the simulated user;
identifying value information associated with the estimated utterance, the value information corresponding to an expected reward that will ensue upon taking the estimated utterance, and the value information incorporating a first measure that reflects an extent to which the estimated utterance is projected to lead to efficient task completion, and a second measure which reflects an extent to which the estimated utterance is projected to lead to dialog behavior that resembles target user behavior being modeled;
based at least on the value information that has been identified, generating an update for application to the simulated user; and
carrying out the update to produce an updated simulated user.

17. The method of claim 6, further comprising:
training paraphrasing functionality of the simulated user in an initial bootstrapping phase based at least on a corpus of training examples obtained from one or more sources of other dialogs between human users and the personal digital assistant.

18. The method of claim 6, further comprising:
updating a deep neural network of the simulated user that is configured based at least on weighting values,
wherein the deep neural network is configured to map an input personal digital assistant utterance into an output simulated user utterance, and
wherein the deep neural network includes feedforward neural network functionality, or convolutional neural network functionality, or recursive neural network functionality, or gating neural network functionality, and/or any combination thereof.

19. The method of claim 6, wherein the self-learning of the personal digital assistant involves reinforcement learning based at least on an objective that promotes at least efficient completion of tasks.

20. A computer-readable storage medium storing computer-readable instructions, the computer-readable instructions, when executed by one or more processor devices, causing the one or more processor devices to perform acts comprising:
receiving an instance of input parameter information, the instance of input parameter information specifying at least a most recent utterance made by a personal digital assistant;
automatically mapping the instance of input parameter information to a particular simulated user utterance;
sending the particular simulated user utterance to the personal digital assistant;
repeating said receiving, automatically mapping, and sending until a particular task associated with a selected dialog has been completed;

providing training data to a training system that characterizes utterances exchanged between the simulated user and the personal digital assistant over a course of one or more dialogs; and receiving an updated simulated user that is generated by the training system based at least on the training data.

* * * * *